United States Patent
Shrivastava et al.

(10) Patent No.: US 10,817,528 B2
(45) Date of Patent: Oct. 27, 2020

(54) SYSTEM AND METHOD FOR DATA WAREHOUSE ENGINE

(71) Applicant: Futurewei Technologies, Inc., Plano, TX (US)

(72) Inventors: Ashish Rai Shrivastava, Plano, TX (US); Alex Elisa Chandra, Plano, TX (US); Mark Brown, Little Elm, TX (US); Debashis Bhattacharya, Plano, TX (US); Alan Gatherer, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 302 days.

(21) Appl. No.: 15/365,755

(22) Filed: Nov. 30, 2016

(65) Prior Publication Data
US 2017/0169034 A1 Jun. 15, 2017

Related U.S. Application Data

(60) Provisional application No. 62/267,764, filed on Dec. 15, 2015.

(51) Int. Cl.
*G06F 16/25* (2019.01)
*G06F 16/21* (2019.01)
*G06F 16/28* (2019.01)

(52) U.S. Cl.
CPC .......... *G06F 16/252* (2019.01); *G06F 16/211* (2019.01); *G06F 16/283* (2019.01)

(58) Field of Classification Search
CPC .......... G06F 17/3056; G06F 17/30292; G06F 17/30592; G06F 16/283; G06F 16/211; G06F 16/252

USPC ........................................... 707/603
See application file for complete search history.

(56) References Cited

U.S. PATENT DOCUMENTS

| 6,088,701 | A | * | 7/2000 | Whaley | ............ | G06F 3/14 |
| 6,633,959 | B2 | * | 10/2003 | Arimilli | ............ | G06F 12/0817 |
| | | | | | | 711/119 |
| 6,754,774 | B2 | * | 6/2004 | Gruner | ............ | G06F 12/0813 |
| | | | | | | 711/119 |
| 7,152,122 | B2 | * | 12/2006 | Kagan | ............ | G06F 13/1605 |
| | | | | | | 709/250 |
| 7,603,487 | B2 | * | 10/2009 | Jagathesan | ............ | G06F 13/28 |
| | | | | | | 710/8 |

(Continued)

FOREIGN PATENT DOCUMENTS

| CN | 104601490 A | 5/2015 |
| CN | 105068953 A | 11/2015 |

OTHER PUBLICATIONS

Gokhale, Maya, et al., "Near memory data structure rearrangement", MEMSYS '15, Washington, DC, Oct. 5-8, 2015, pp. 283-290.*

(Continued)

*Primary Examiner* — Robert Stevens
(74) *Attorney, Agent, or Firm* — Slater Matsil, LLP

(57) ABSTRACT

A data warehouse engine (DWE) includes a central processing unit (CPU) core and a first data organization unit (DOU), where the first DOU is configured to aggregate read operations. The DWE also includes a first command queue coupled between the CPU core and the first DOU, where the first command queue is configured to convey commands from the CPU core to the first DOU.

20 Claims, 16 Drawing Sheets

(56) References Cited

U.S. PATENT DOCUMENTS

| | | | | |
|---|---|---|---|---|
| 7,917,695 | B2* | 3/2011 | Ulrich | G06F 3/061 |
| | | | | 711/114 |
| 8,214,590 | B2* | 7/2012 | Ulrich | G06F 3/061 |
| | | | | 711/114 |
| 8,380,909 | B2* | 2/2013 | Borchers | G06F 3/0613 |
| | | | | 710/263 |
| 8,386,682 | B2* | 2/2013 | Yeem | G06F 13/364 |
| | | | | 710/113 |
| 8,880,819 | B2* | 11/2014 | Walker | G06F 13/1626 |
| | | | | 711/158 |
| 8,966,354 | B2 | 2/2015 | Morikawa | |
| 9,432,298 | B1* | 8/2016 | Smith | H04L 49/9057 |
| 2002/0156975 | A1* | 10/2002 | Staub | G06F 9/5083 |
| | | | | 711/114 |
| 2002/0161846 | A1* | 10/2002 | Ulrich | G06F 9/5083 |
| | | | | 709/213 |
| 2003/0196040 | A1* | 10/2003 | Hosogi | G06F 12/0833 |
| | | | | 711/128 |
| 2010/0262979 | A1* | 10/2010 | Borchers | G06F 9/544 |
| | | | | 719/321 |
| 2010/0293312 | A1* | 11/2010 | Sonnier | G06F 15/167 |
| | | | | 710/107 |
| 2010/0293353 | A1* | 11/2010 | Sonnier | G06F 15/167 |
| | | | | 711/170 |
| 2014/0156951 | A1* | 6/2014 | Pierson | H04L 63/0263 |
| | | | | 711/146 |
| 2015/0019840 | A1* | 1/2015 | Anderson | G06F 9/30145 |
| | | | | 712/206 |
| 2015/0278092 | A1* | 10/2015 | Smentek | G06F 9/5016 |
| | | | | 711/119 |
| 2015/0324118 | A1 | 11/2015 | McCambridge et al. | |
| 2016/0011996 | A1* | 1/2016 | Asaad | G06F 9/3004 |
| | | | | 710/308 |
| 2016/0103707 | A1 | 4/2016 | Bhattacharya et al. | |
| 2017/0103076 | A1 | 4/2017 | Bhattacharya et al. | |
| 2017/0103093 | A1 | 4/2017 | Chandra et al. | |
| 2017/0109096 | A1* | 4/2017 | Jean | G06F 3/0659 |

OTHER PUBLICATIONS

Lloyd, Scott, et al., "In-Memory Data Rearrangement for Irregular, Data-Intensive Computing", Computer, vol. 48, Issue 8, Aug. 2015, pp. 18-25.*

Hoover, Greg, et al., "Synthesizing Synchronous Elastic Flow Networks", DATE '08, Munich, Germany, Mar. 10-14, 2008, pp. 306-311.*

Plattner, Hasso, "The Impact of Columnar In-Memory Databases on Enterprise Systems", 40th International conf. on Very Large Data Bases, Hangzhou, China, Sep. 1-5, 2014, pp. 1722-1729, Proc. of the VLDB Endowment, vol. 7, No. 13.*

Coppola, Massimo, et al., "High-performance data mining with skeleton-based structured parallel programming", Parallel Computing, vol. 28, Issue 5, May 2002, pp. 793-813.*

"Non-uniform memory access", Wikipedia, downloaded from en.wikipedia.org/wiki/Non-uniform_memory_access on Mar. 24, 2020, pp. 1-3.*

Gokhale et al., "Near memory data structure rearrangement", MEMSYS '15, Washington, DC, Oct. 5-8, 2015, pp. 283-290.*

Shin, Wongyu, et al., "NUAT: A Non-Uniform Access Time Memory Controller", HPCA 2014, Orlando, FL, Feb. 15-19, 2014, pp. 464-475.*

* cited by examiner

SYSTEM AND METHOD FOR DATA WAREHOUSE ENGINE

CROSS-REFERENCE TO RELATED APPLICATIONS

This application claims the benefit of U.S. Provisional Application No. 62/267,764, filed on Dec. 15, 2015, which application is hereby incorporated herein by reference.

TECHNICAL FIELD

The present disclosure relates generally to a system and method for data storage, and, in particular embodiments, to a system and method for a data warehouse engine.

BACKGROUND

Radio access network (RAN) systems-on-a-chip (SoCs) are based on a hierarchy of globally mapped memories, which may be on-chip or off-chip. The memories cater to heterogeneous compute engines (CEs), such as central processing units (CPUs) for control processing, digital signal processors (DSPs) for a mixture of control and signal processing, and hardware accelerators (HACs) for signal processing.

In some examples, memories are treated as dumb storage. This may lead to CPUs and DSPs managing memories, which may cause non-uniform memory access related stalls in CEs. This may lead to the use of huge, multi-ported memories which may handle the worst case random stalls. This may lead to overdesigning of SoCs and a lack of scalability.

SUMMARY

An embodiment data warehouse engine (DWE) includes a central processing unit (CPU) core and a first data organization unit (DOU), where the first DOU is configured to aggregate read operations. The DWE also includes a first command queue coupled between the CPU core and the first DOU, where the first command queue is configured to convey commands from the CPU core to the first DOU.

An embodiment DWE also includes a response queue coupled between the first DOU and the CPU core, where the response queue is configured to convey responses from the first DOU to the CPU core. In an embodiment, the first DOU is further configured to perform on-the-fly data reorganization. An embodiment DWE also includes a second DOU and a second command queue coupled between the CPU core and the second DOU. In an embodiment, the first DOU is configured to perform at least one of disaggregate write operations, disaggregate read operations, and aggregate write operations.

An embodiment data organization unit (DOU) includes a source cache storage and a command queue (cQ) message decoder coupled to the source cache storage, where the cQ message decoder is configured to receive a message from a central processing unit (CPU) core. The DOU also includes a read interface coupled to the source cache storage, where the read interface is configured to receive data from data storage and store the data in the source cache storage in accordance with the message.

An embodiment DOU also includes an elastic buffer coupled to the source cache storage and a destination cache storage coupled to the elastic buffer.

An embodiment DOU also includes a write manager coupled to the destination cache storage, a write command queue coupled to the write manager, and a write interface coupled to the write command queue. In one embodiment, the DOU also includes a response queue (rQ) message encoder coupled to the write interface, wherein the rQ message encoder is configured to send response messages to the CPU. In an additional embodiment, the DOU includes a read data transformer coupled to the read interface, a stream buffer coupled to the read data transformer, and a streaming write address generator coupled to the cQ message decoder and the stream buffer. In an embodiment, the DOU also includes a write transformer coupled between the stream buffer and the write command queue.

An embodiment DOU also includes a transaction generator coupled to the cQ message decoder. The DOU may additionally include a data storage allocator and tracker coupled between the transaction generator and the source cache storage. The DOU may also include a streaming read address generator coupled to the cQ message decoder and to the transaction generator and a read command queue coupled to the streaming read address generator and to the read interface.

An embodiment method includes receiving, by a data organization unit (DOU) from a central processing unit, a message and obtaining, by the DOU from a source storage, first data, in accordance with the message. The method also includes reorganizing the first data to produce second data and storing the second data in a destination storage.

In an embodiment method, the source storage is the destination storage. In another embodiment method, reorganizing the first data includes scattering the first data using disaggregation. In an embodiment, scattering the first data includes performing non-uniform scattering or streaming scattering. In another embodiment, reorganizing the first data includes gathering the first data using aggregation. In an embodiment method, gathering the first data includes performing non-uniform gathering or streaming scattering.

The foregoing has outlined rather broadly the features of an embodiment of the present disclosure in order that the detailed description of the disclosure that follows may be better understood. Additional features and advantages of embodiments of the disclosure will be described hereinafter, which form the subject of the claims of the disclosure. It should be appreciated by those skilled in the art that the conception and specific embodiments disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
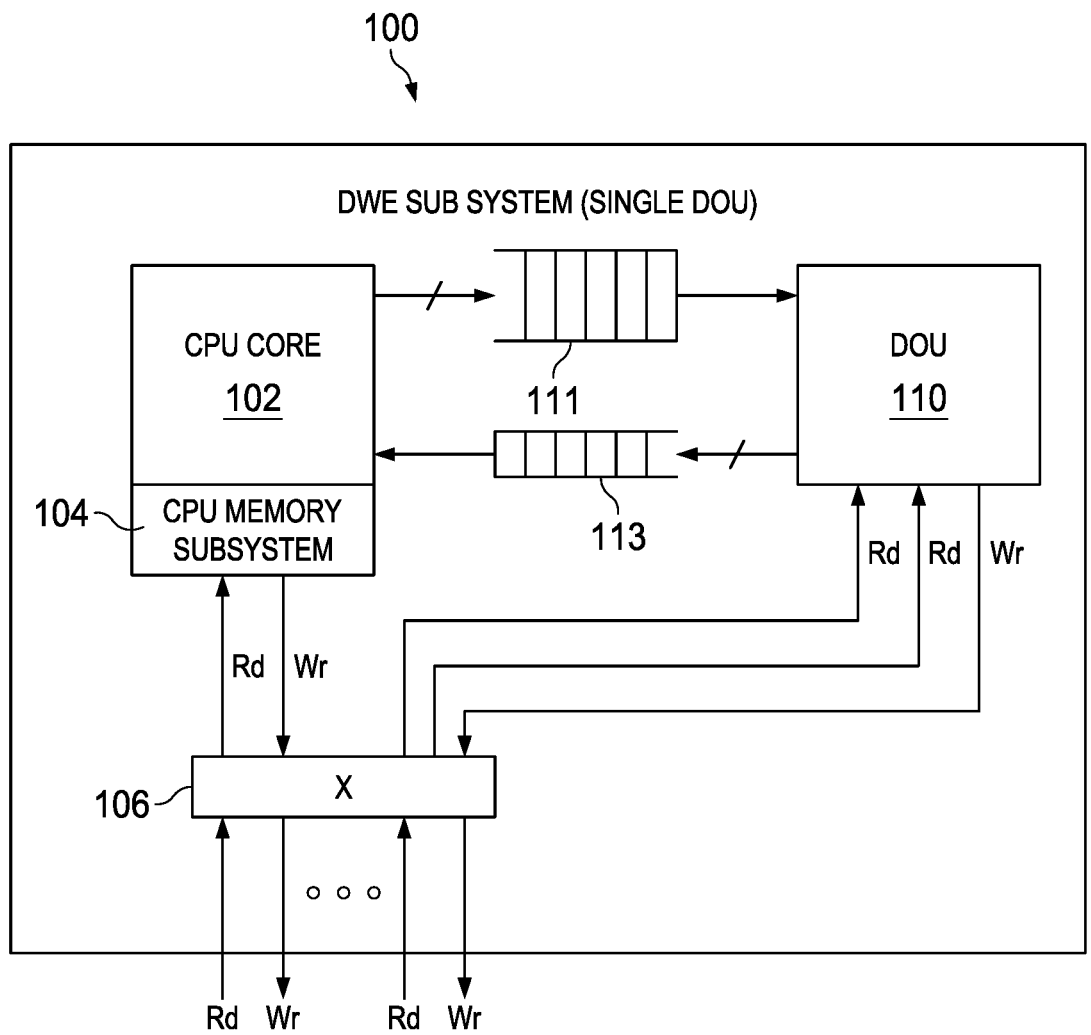
FIG. 1 illustrates an embodiment data warehouse engine (DWE)

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

Data access patterns for systems-on-a-chip (SoCs) may be complicated. Memory input/output (I/O) utilization, especially for double data rate (DDR) synchronous dynamic random access memory (SDRAM) interfaces, may be aggregated with non-uniform reads and writes to and from the DDR SDRAM. Expensive multi-ported memory banks may be based on data organization using semantics aware on-the-fly data organization before the data is required for processing. Additional details on data access patterns in SoCs are discussed in U.S. patent application Ser. No. 14/877,155 filed on Oct. 7, 2015, and entitled "System and Method for System on a Chip," which application is hereby incorporated by reference.

A real-time Data Warehouse (rDW) system and method includes efficient storage management and methods for defining, accessing, and managing stored data in a real-time system. In an embodiment, storage is decoupled from computation. A wireless data movement domain specific language uses specialized queries and stores. Additional details on rDW are discussed in U.S. patent application Ser. No. 15/169,094 filed on May 31, 2016, and entitled, "System and Method for Real-Time Data Warehouse," which application is hereby incorporated herein by reference. Additional details on scalable distributed rDW (sdrDW) are discussed in U.S. patent application Ser. No. 15/264,095 filed on Sep. 13, 2016, and entitled, "System and Method for Scalable Distributed Real-Time Data Warehouse," which application is hereby incorporated herein by reference.

An embodiment data warehouse engine (DWE) provides an intelligent and flexible data movement capability with on-the-fly data reorganization, and aggregation and disaggregation for non-uniform and patterned data accesses. In an embodiment, users request and receive data using a well-defined interface, which may be modified post-silicon by changing the software in the DWE. In an embodiment, data is stored with a known organization. An embodiment DWE has fully software programmable data management capabilities. Thus, an embodiment DWE has infinite variations of configuration. For comparison, a direct memory access (DMA), which is a finite state machine, only has a finite number of variations in configuration.

In cache based compute engines (CEs), such as central processing units (CPUs) and digital signal processors (DSPs), remote non-uniform access to DDR SDRAM and patterned access to level 2 (L2), shared level 2 (SL2), and DDR SDRAM may be cached in local caches, which may exploit locality, because cache is temporary and local. Multiple lines of cache may be read sequentially. However, it is desirable to access the cache in a non-sequential manner. Also, cache architectures may be limited in the number of ways, and the size, which may be supported. For n-way cache, n may, for example, be 4, 8, or 16. Multiple non-uniform or patterned accesses may cause significant cache locality disruptions and increase cache misses from the limited cache capacity. Multiple non-uniform or patterned accesses may also lead to conflict cache misses, i.e. compute engine stalls. Increasing the size and/or number of ways for cache may ease these disruptions from non-uniform or patterned accesses to memory. However, scaling is problematic, because cache is dimensioned to handle the worst case scenario. Also, cache may utilize significant area, power, and cost.

In an embodiment DWE, locality and aggregate reads and writes may be used when there are no other disruptions which break the locality. In an embodiment data organizing unit (DOU) processes only one job at a time. An embodiment DWE uses a source cache buffer which operates as fully associative cache to aggregate memory writes inside a DOU. Also, an embodiment DOU uses a destination buffer, which operates as fully associative cache and aggregates memory writes in the DOU. For example, content addressable memory (CAM) tags may be used to implement source and destination caches.

An embodiment improves memory I/O utilization by reading an entire cache line, which is cached in a source storage. Requested data, which may be a subset of the data or all of the data, is forwarded to and merged within the destination storage, so writes occur at the cache line size. The cache line size is configurable to support different burst sizes of the memory interfaces. In other examples, cache line sizes are fixed and are not configurable. In an example, CAM-tag sources and CAM-tag destinations may be used. An embodiment DWE performs aggregation and disaggregation from a SoC. In one example, the DWE performs aggregation and disaggregation in one pass. Also, an embodiment DWE performs scattering, gathering, and streaming.

In an embodiment, user configuration information is available ahead of time. For example, in a wireless radio access technology (RAT) lower layer, such as the physical (PHY) layer, user configuration information is known in advance from a higher layer, such as the media access control (MAC) layer. Data may be organized in an algorithm specific format in advance of the time that a task is scheduled to process the data. Shared on-the-fly data organization logic may cater to the data organization required by the entire system when the organization details are available ahead of time. A temporary fast storage memory may temporarily organize and store data near a slow remote memory, such as DDR SDRAM. For example, a data warehouse, such as an rDW or an sdrDW, may be used.

An embodiment DOU has data organization logic situated between source storage and destination storage. The data organization logic organizes the data while storing or retrieving the data from the slow remote memory, such as DDR SDRAM. An embodiment DOU contains on-the-fly data reorganization. In an embodiment, an intelligent controller is coupled between the bulk memory and the devices making queries.

An embodiment executes semantics aware data movement using a domain specific language with specialized queries and stores. A CPU with or without cache uses specialized instructions to process the queries and stores, and to trigger the DOU to execute those commands. It is desirable to minimize the communication and control cost between the CPU core, which processes the queries and stores, and the DOU, which executes the data organization and movement. An embodiment DWE may include multiple CPUs and/or multiple DOUs.

In an embodiment DWE, a CPU core is closely coupled to a DOU. The CPU core may be any general-purpose programmable processor. The embodiment DOU efficiently executes semantics aware data movement for queries. Also, the DOU stores and aggregates reads and writes to storage using source storage and destination storage to increase the I/O bandwidth utilization of the memory interfaces and performing on-the-fly algorithm specific data organization. An embodiment DWE is flexible and configurable. An embodiment DWE includes on-the-fly domain specific data organization. Also, an embodiment DWE includes the method and logic used to organize and optimize the non-uniform data accesses and patterned streamline data accesses while moving it from one storage to another storage.

An embodiment mechanism aggregates non-uniform or patterned read and write accesses to storage with on-the-fly algorithm specific data organization. In an example, a CPU core is closely coupled to a DOU, which contains source storage and destination storage. The DOU may also include data organization logic to organize the data in algorithm specific ways, locally, well in advance of when the data is needed for processing.

An embodiment improves memory I/O bandwidth utilization, especially for DDR SDRAM interfaces, by aggregating non-uniform reads and writes from and to DDR SDRAM. An embodiment performs semantics aware on-the-fly domain specific data organization before the data is needed for processing. An embodiment efficiently executes semantics aware data movements which are described by a domain specific language (DSL) using specialized queries and stores. An embodiment reduces compute engine stalls. An embodiment provides scalability for SoCs.

FIG. 1 illustrates the DWE 100, an embodiment queue based DWE subsystem with a single DOU, the DOU 110. The DWE 100 includes the CPU core 102 and the CPU memory subsystem 104. The CPU core 102 may be any general purpose programmable processor. The CPU memory subsystem 104 may include cache and/or static random access memory (SRAM).

The CPU core 102 is coupled to the DOU 110 via a queue based interface, including the command queue 111 and the response queue 113. The DOU 110 performs data organization by aggregating reads and writes to the memory interface, and performing on-the-fly data reorganization. Also, the DOU 110 receives commands from the CPU core 102 over the command queue 111, for example over a 128 bit queue. The commands in the command queue 111 instruct the DOU 110 on how to organize, read, and write data. The DOU 110 responds to the CPU core 102 over the response queue 113, which may be a 32 bit wide queue. The response queue carries commands, which may, for example, indicate that the DOU has completed reorganization, or that the DOU has encountered a problem in performing the reorganization.

Data 106 is read from off-chip data storage (not pictured) and written to the CPU memory subsystem 104. Additionally, the data 106 is written to the off-chip data storage from the CPU core 102. Two read/write channels are pictured, but more read channels and more write channels may be used. In this example, there is one data 106. In other examples, there are more data blocks.

Figure 2:
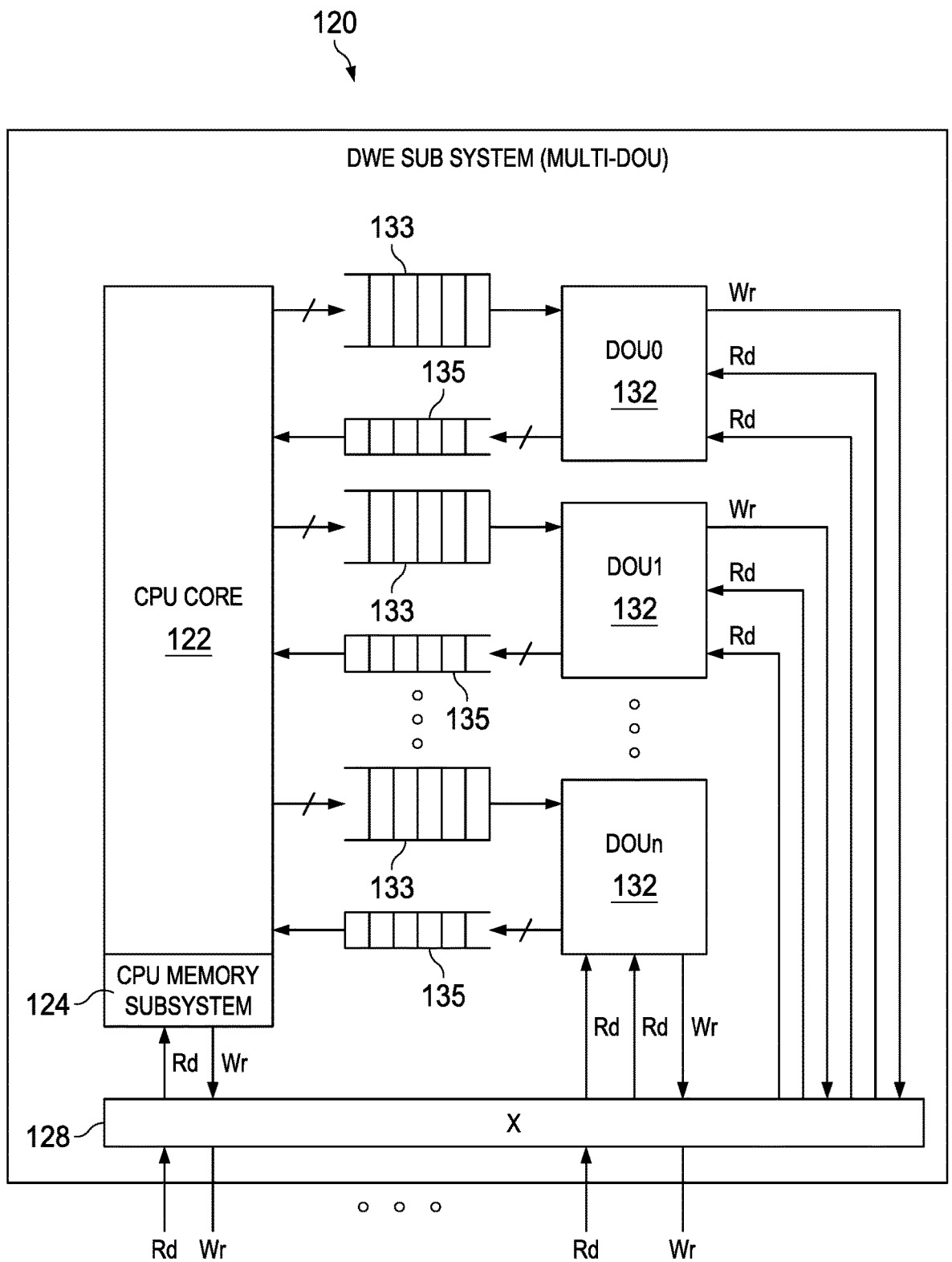
FIG. 2 illustrates another embodiment DWE.

FIG. 2 illustrates the DWE 120, an embodiment multi-DOU DWE subsystem with multiple DOUs 132. The DWE 120 includes the CPU core 122 and the CPU memory subsystem 124, which may include cache or SRAM. The CPU core 122 may be any general purpose programmable processor.

The CPU core 122 is closely coupled to the DOUs 132, n DOUs, over a queue based interface, including the command queues 133 and the response queues 135. The DOUs 132 receive commands from the CPU core 122 over the command queues 133, which may, for example, be 128 bit queues. Also, the DOUs 132 transmit commands to the CPU core 122 over the response queues 135, which may, for example, be 32 bit queues.

The data 128 is read from and written to the external data storage (not pictured) by the CPU core 122. Two read channels and two write channels are pictured, but there may be more read channels and write channels. One data block is pictured, but more data blocks may be present.

A DOU may operate in non-uniform access mode or in streaming access mode. In non-uniform access mode, aggregation of non-uniform reads and non-uniform writes is supported by query and store operations. On the other hand, in streaming access mode, streaming scatter and gather operations are performed.

A DWE may support absolute mode, implicit address mode, and streaming address mode. In absolute address mode, the CPU core calculates the absolute addresses for the queries and stores. These addresses are embedded in the DOU commands. In implicit address mode, the DWE accelerates the query and store address calculations by generating the absolute addresses for queries and stores internally. For example, the DWE may use a look-up table to obtain a pre-calculated offset for the absolute addresses. Streaming address mode uses internal streaming address generator logic to generate addresses in the DOU.

Figure 3A:
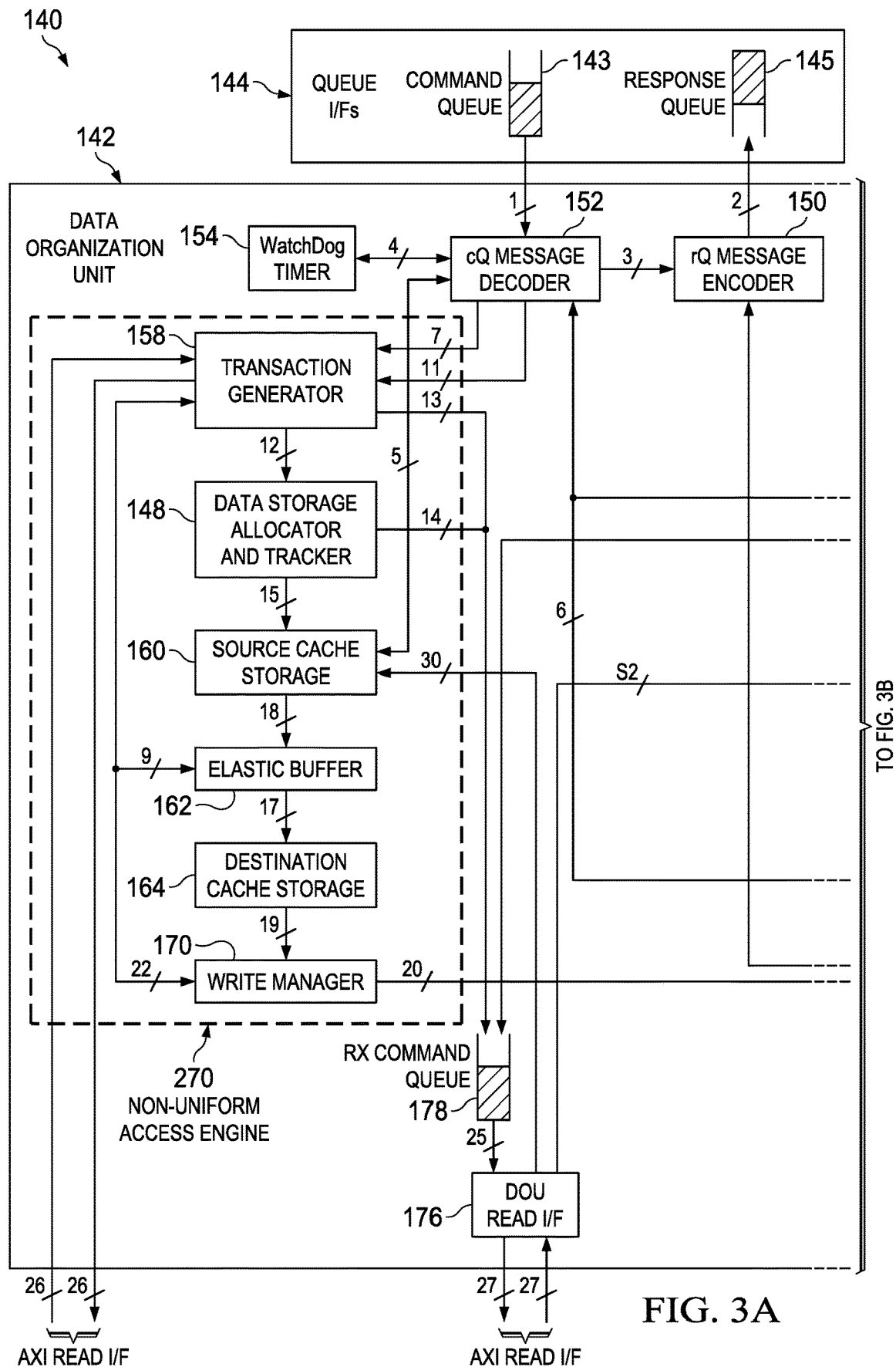
FIGS. 3A and 3B illustrate an embodiment data organization unit (DOU)

FIG. 3A illustrates the DOU architecture 140, which includes the DOU 142 and the queue interface 144. The DOU 142 communicates with the CPU core (not pictured) over the queue interface 144. The queue interface 144 includes the command queue 143 and the response queue 145. The command queue 143, which may be 128 bits, receives encoded commands from the CPU core. These commands indicate addresses for read and write operations to external data storage. Also, the commands may indicate whether absolute mode, implicit address mode, or streaming address mode is used. Commands may be used to trigger the reorganization of data. Also, the response queue 145, which may be 32 bits, sends encoded responses to the CPU core. These responses indicate whether requested transactions have been successfully performed.

The command queue (cQ) message decoder 152 decodes incoming messages from the command queue 143 received from the CPU core, and takes an action based on the incoming message. The cQ message decoder 152 receives the command over link 1 from the command queue 143. The cQ message decoder 152 determines the address, the number of bytes, and the action to be performed. For example, the cQ message decoder 152 may receive the absolute address. In another example, the cQ message decoder determines the absolute address based on the command, for example using a look-up table. The cQ message decoder 152 may configure the streaming write address in the streaming write (TX) address generators 146 using link 6. In an example, the cQ message decoder 152 configures the transaction generator 158 by sending a message over link 7. The cQ message decoder 152 sends address bytes to the transaction generator 158. Additionally, the cQ message decoder 152 may configure the streaming read (RX) address in streaming RX address generators 156 using message over link 8. Also, the cQ message decoder 152 may decode the command and send a message to the transaction generator 158 over link 11. The cQ message decoder 152 sends messages to the source cache storage 160 over link 5. The cQ message decoder 152 also sends messages to the response queue (rQ) message encoder 150 over link 3. In an embodiment, the cQ message decoder 152 communicates with the watchdog timer 154 over link 4. Another embodiment does not use the watchdog timer 154.

The rQ message encoder 150 encodes messages for transmission in the response queue 145 of queue interface 144 using link 2, to the CPU core. The rQ message encoder 150 receives a message from the cQ message decoder 152 over link 3. The rQ message encoder 150 sends messages received from the DOU write interface (I/F) 174 over link 29, indicating the current DOU status. In one example, response queue 145 is a 32 bit queue.

The non-uniform access engine 270 includes the transaction generator 158, the data storage allocator and tracker 148, the source cache storage 160, the elastic buffer 162, the destination cache storage 164, and the write manager 170. The transaction generator 158 generates transactions based on the information received from the cQ message decoder 152 via link 11. The transaction generator 158 makes a request to the data storage allocator and tracker 148 using link 12, inquiring whether the requested data is inside the cache. When the data is not inside the cache, the data storage allocator and tracker 148 kills the transaction. The information may include the source address, destination address, the size, and streaming parameters. The transaction generator 158 generates and extracts addresses and sizes for transactions. Additionally, the transaction generator 158 generates DOU storage transactions, which may be in non-uniform mode or streaming mode. The DOU transactions originate from the CPU core. The transaction generator 158 sends request to the data storage allocator and tracker 148 to request that a cache line be allocated in the source cache storage 160. Also, the transaction generator 158 submits the request to the RX command queue 178 via link 13, in a pipelined manner. When the transaction is hit in the source cache storage 160, the data storage allocator and tracker 148 sends a special signal to cancel redundant requests. Additionally, a 128 bit advanced extensible interface (AXI) read interface may be used, for example interface 26, to communicate with off chip data storage (not pictured). Another interface, such as AXI coherency extension (ACE), advanced high-performance bus (AHB), advanced peripheral bus (APB), or another interface may be used. The transaction generator 158 also communicates with the elastic buffer 162 over link 9, and with the write manager 170 over link 22.

The data storage allocator and tracker 148 manages and tracks storage allocations in the source cache storage 160. Storage allocation requests are received from the transaction generator 158 over link 12. The data storage allocator and tracker 148 determines whether to approve a received transaction. For example, a request might be denied when the requested data is not in the cache. The data storage allocator and tracker 148 responds to the transaction generator 158 indicating whether the request is approved or denied. When the transaction is approved, the data storage allocator and tracker 148 updates the tracking of the cache based on the approved transaction. When the request is for a store transaction, and the data is not in the cache, the data storage allocator and tracker 148 requests space in the cache for the data. Also, when a transaction is approved, and storage is allocated, the data storage allocator and tracker 148 sends the transaction to the RX command queue 178 via link 14. The data storage allocator and tracker 148 allocates the cache lines for the DOU transactions in the source cache storage 160 via link 15. When the cache line has already been allocated, the data storage allocator and tracker 148 sends a kill signal to the RX command queue 178 to avoid the submission of redundant requests.

The source cache storage 160 contains source storage to capture DOU transactions. The cache storage lines are allocated over link 15 from the data storage allocator and tracker 148. Also, the source cache storage 160 stores metadata to uniquely identify the source storage lines. The source cache storage 160 receives communications from the DOU read interface 176 over link 30. In one example, CAM-tag addresses are used. The metadata may include the source address, the destination address, the destination bytes, and the distance between the source address and the destination address. Thus, the metadata indicates the destination where the data will go when it is evicted. The data stays in the source storage until it is evicted. The data may be evicted, for example, when the whole system is flushed, or other data needs to take the location in the cache. When the source cache storage 160 is evicted, the data may be sent to the elastic buffer 162 over link 18.

The elastic buffer 162 synchronizes the eviction from the source cache storage 160 to the writing to the destination cache storage 164, for example using FIFOs. The source cache storage 160 sends eviction messages to the elastic buffer 162 via link 18. Also, the destination cache storage 164 de-queues the commands from the elastic buffer 162 via link 17. Additionally, the elastic buffer 162 communicates with the transaction generator 158 via link 9.

The destination cache storage 164 aggregates the non-uniform writes, which are narrow by nature, by exploiting the write interface. Additionally, the destination cache storage 164 de-queues source storage evicted commands received from the elastic buffer 162 over link 17. When receiving flush commands from the CPU core, the destination cache storage 164 begins flushing the destination storage using the write manager 170 over link 19. The destination cache storage 164 performs a gathering function when data is flushed from the source storage. The destination cache storage 164 assembles bigger lines of data gathered from different locations in the source cache storage 160, until the line is reasonably full or forced to be evicted. In some examples, the destination cache storage 164 is not present.

The write manager 170 performs write operations for aligned and non-aligned addresses on external data storage. Commands are received from transaction generator 158 over link 22. Also, data is received from the destination cache storage 164 via link 19. The write manager 170 tracks the write responses, which indicate whether the write has been successfully committed to the storage. Additionally, the write manager 170 generates appropriate write commands for the TX command queue 172 over link 20.

The RX command queue 178 queues the RX commands for DOU transactions from the transaction generator 158 received over link 13. Also, the RX command queue 178 determines whether the read commands are submitted or removed based on a signal from the data storage allocator and tracker 148 via link 14. Additionally, the RX command queue 178 receives addresses from the streaming RX address generator 156 over link S1. The commands are sent to the DOU read interface 176 over link 25. Data returned from the RX commands is placed in the appropriately allocated source cache line in the source cache storage 160 for non-uniform access mode and into the read data transformation 274 via link S2.

The DOU read interface (I/F) 176 executes read commands from the RX command queue 178 via link 25. The DOU read interface 176 reads in data from external data storage (not pictured). The DOU read interface 176 converts the read commands into an interface specific protocol on interface 27, for example a 256 bit AXI read interface. Also, the DOU read interface 176 routes this read data to the appropriate source storage line in the source cache storage 160 over link 30 for non-uniform access mode, or to the read data transformation 274 (illustrated in FIG. 3B) via link S2. Data returned based on the read commands is placed in the appropriately allocated source storage line in the source cache storage 160 via link 30.

Figure 3B:
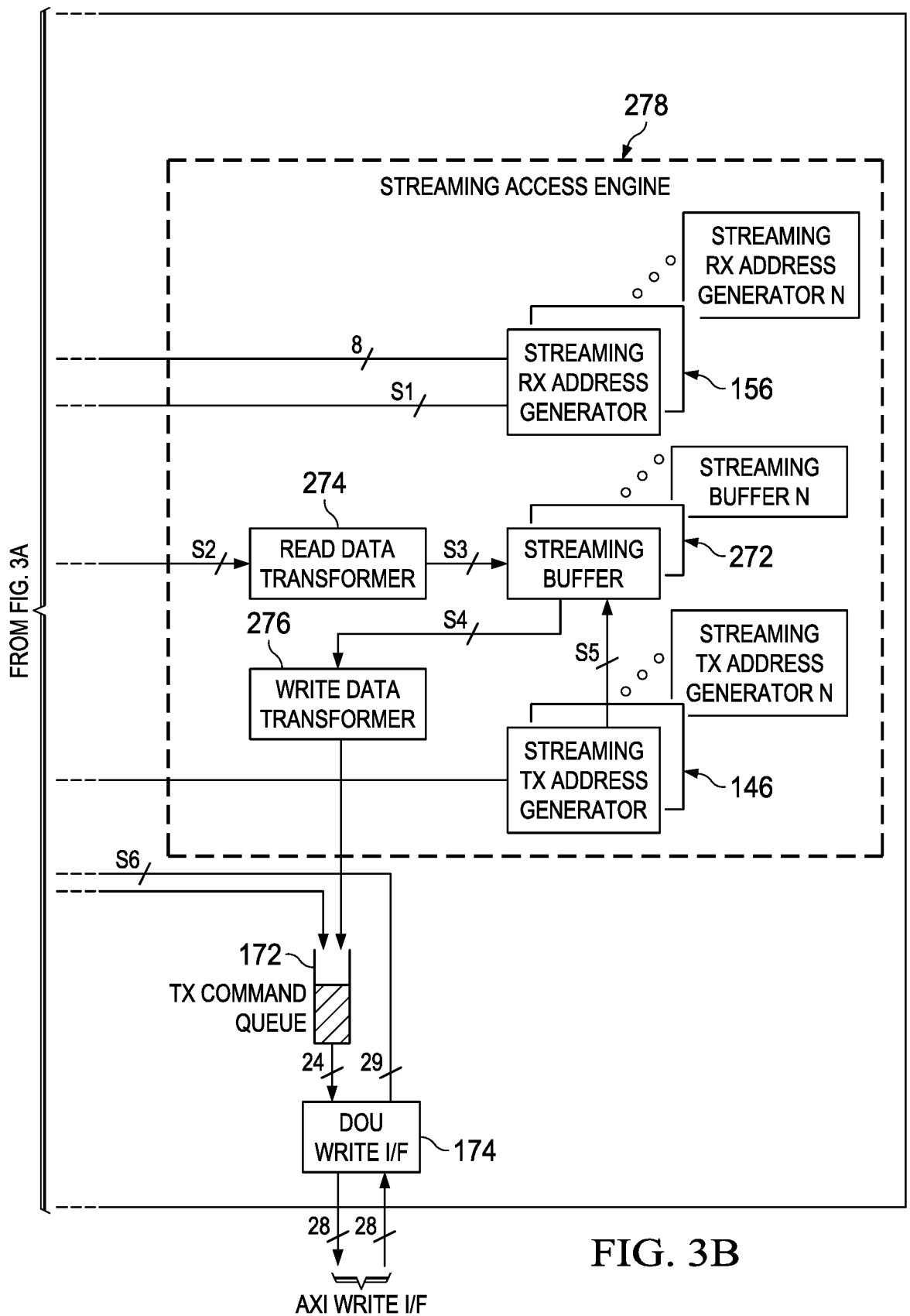

In FIG. 3B, the streaming access engine 278 includes the streaming RX address generators 156, the read data transformer 274, the streaming buffers 272, the streaming TX address generators 146, and the write data transformer 276. In some modes, for example modes other than streaming mode, the streaming access engine 278 is not used.

The streaming RX address generators 156 generate streaming addresses for read and write operations. In one embodiment, the address pattern has been programmed by the CPU core via command messages. For example, command queue messages are received from cQ message decoder 152 over link 8 and from streaming TX address generators 146 over link 6. The streaming RX address generator 156 sends streaming read addresses for transactions to the RX command queue 178 over link S1. The streaming RX address generators 156 may communicate with the streaming TX address generators 146 over links 6 and 8. Baseband applications may have multiple antennas, and data might not be contiguous stored in storage. Streaming scattering/gathering may be performed, where data is streamed from multiple disjoint locations. Data may be reorganized into an arbitrary shape, for example using scattering and gathering.

The read data transformer 274 performs data transformation on the data received from the DOU read interface 176 via link S2. Some examples of data transformations include compression, Hermitian compression, and format conversion, for example fixed point to floating point conversion or floating point to fixed point conversion. The transformed data is sent to the streaming buffers 272 via link S3.

The streaming TX address generator 146 generates streaming addresses for write operations in streaming mode. The address pattern may be programmed by the CPU core via command messages. The streaming TX address generator 146 provides the streaming write address to the streaming buffers 272 via link S5. When streaming address generation is performed, some caches may be bypassed.

The streaming buffers 272 are circular buffers, which receive data from the read data transformer 274 via link S2. The streaming buffers 272 also receive transmission addresses over link S5 from the streaming TX address generators 146. The circular buffer is used for temporary storage of the streaming data. In an embodiment, the streaming buffers 272 perform corner turns, such as matrix transposes. The data is output from the streaming buffers 272 to write data transformation 276 via link S4. As pictured, the streaming buffers 272 are separate blocks. However, in an embodiment, the streaming buffers 272 are overlaid with the storage for the source/destination cache.

The write data transformer 276 receives data from the streaming buffers 272 over link S4. The write data transformer 276 transforms the outgoing data. Examples of the outgoing data transformation include expansion, Hermitian expansion, and format conversion, for example from fixed point to floating point, or from floating point to fixed point. The transformed data is sent to the TX command queue 172 via link S6.

The TX command queue 172 synchronizes the write manager 170 with the DOU write interface 174. Commands are received from write manager 170 over link 20, and write date is received from write data transformation 276 over link S6. The commands and write data are output to the DOU write interface 174 over link 24. The TX command queue 172 provides backwards pressure when the DOU write interface is stalled.

The DOU write interface 174 de-queues the transmission queues from the TX command queue 172 over link 24 and the write data from the TX command queue 172 over the interface 28, for example an AXI write interface. The DOU write interface 174 performs interface specific protocol conversion, for example on interface 28. For example, a 256 bit AXI write interface with byte enable may be used. The data is written over the interface to external data storage. Also, completion of all write transactions is indicated via link 29 to the rQ message encoder 150 to signal that the operation is complete.

The watchdog timer 154 resolves deadlocks of the DOU. The watchdog timer 154 communicates with the cQ message decoder 152 over link 4. The watchdog timer may be punched when a request arrives, and again when the request is serviced. The watchdog timer 154 flushes the system when a task takes too long to respond, to prevent hang-ups.

In the source storage, reads are aggregated to the burst size of the memory interface, and stored in the source storage, so future read accesses which hit the storage may be serviced by the source storage. In setting the size of the source storage, there is a tradeoff between the benefit of locality and the inconvenience of disruptions. In the destination storage, writes are aggregated by caching writes to the destination storage. Multiple narrow writes within the scope of the same destination line may be aggregated as one cache line write. Data storage allocation and tracking may be used to manage the internal source storage and destination storage of the DOU to preserve locality. Data organization logic supports organizing multiple data streams accessed via multi-dimensional access patterns.

Figure 4:
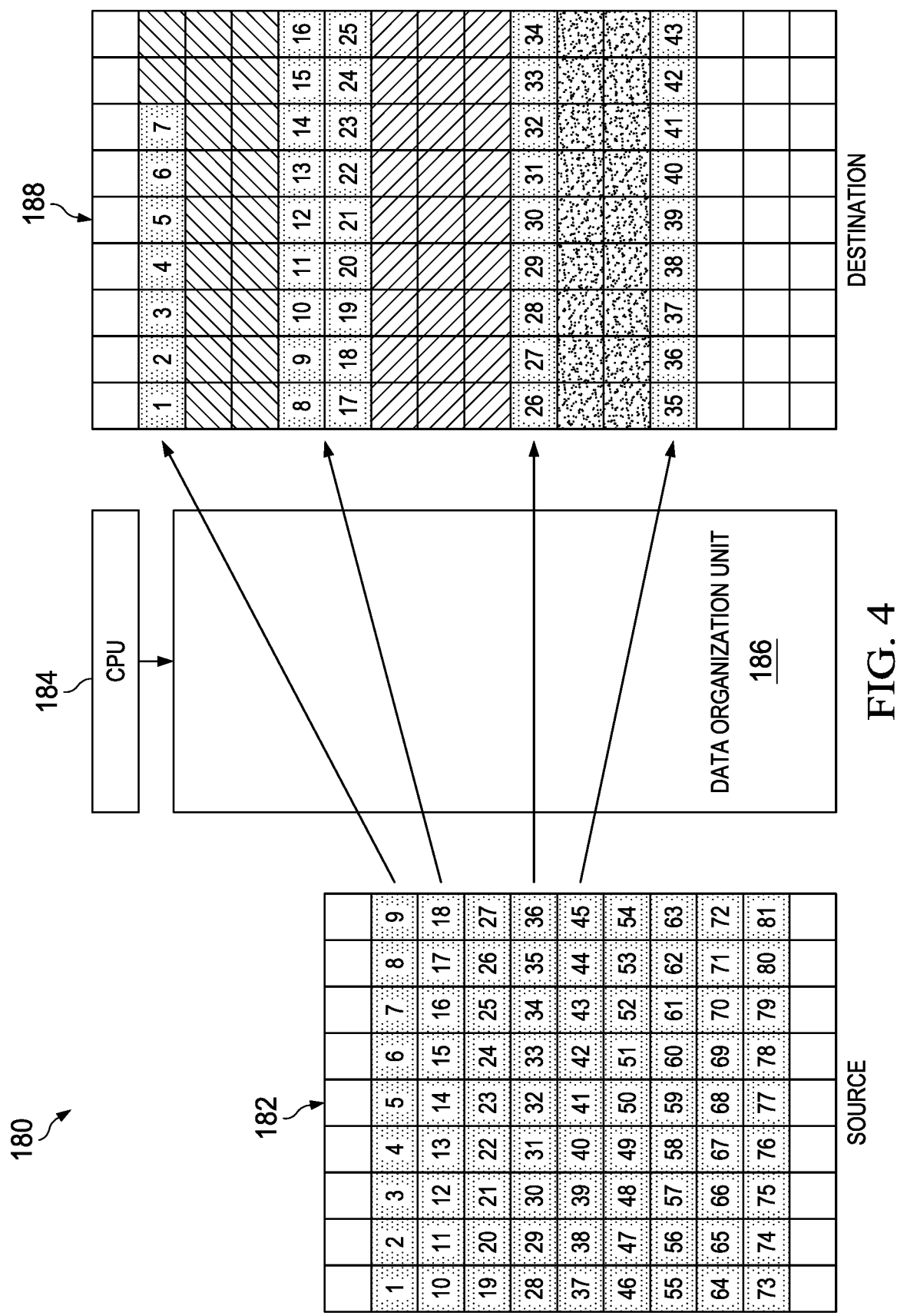
FIG. 4 illustrates an embodiment method of store scattering performed by a DOU.

FIG. 4 illustrates the method 180 for store scattering, performed by the DOU 186. The CPU 184 sends commands to the DOU 186. The DOU 186 reads in data from the source storage 182. The source storage has the data stored together, for example in the order in which it has been received. Data is read into the DOU 186, where it is reorganized. In the reorganization, data which is contiguous in the source storage 182 is scattered to non-contiguous locations in the destination storage 188. The data is scattered to four different regions of the destination storage 188.

Figure 5:
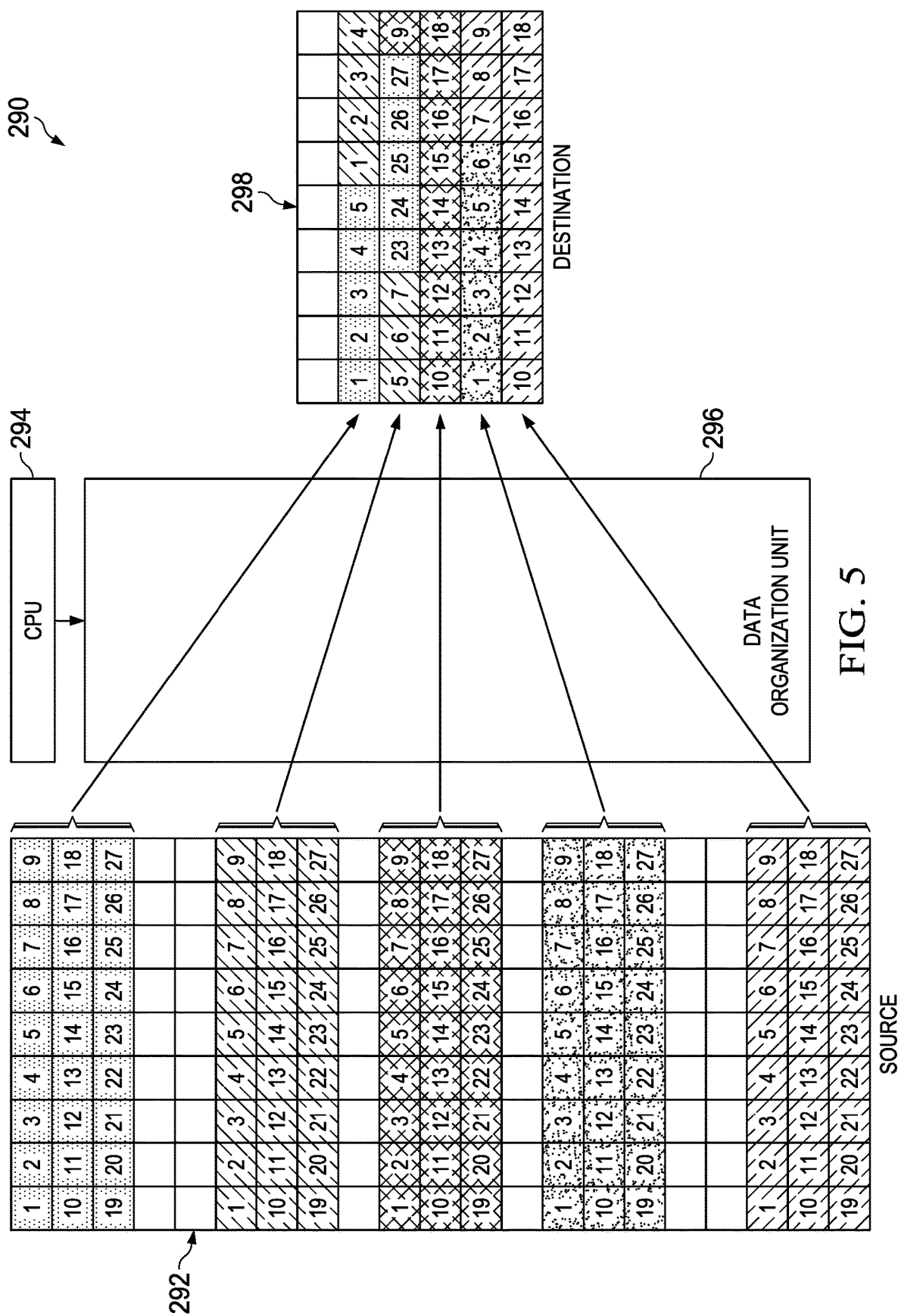
FIG. 5 illustrates an embodiment method of query gathering performed by a DOU.

FIG. 5 illustrates the method 290 for query gathering, performed by the DOU 296. The CPU 294 sends commands to the DOU 296. The DOU 296 reads data from the source storage 292. The data is stored in separate regions of the source storage 292. In this example, the data is stored in five separate regions of the source storage 292. The data from different regions of the source storage 292 is intermixed. The DOU 296 reads in the data from non-contiguous locations in the source storage 292, and gathers the data to be stored together, contiguously, in the destination storage 298. Then, the DOU 296 stores the gathered data in the destination storage 298.

Figure 6:
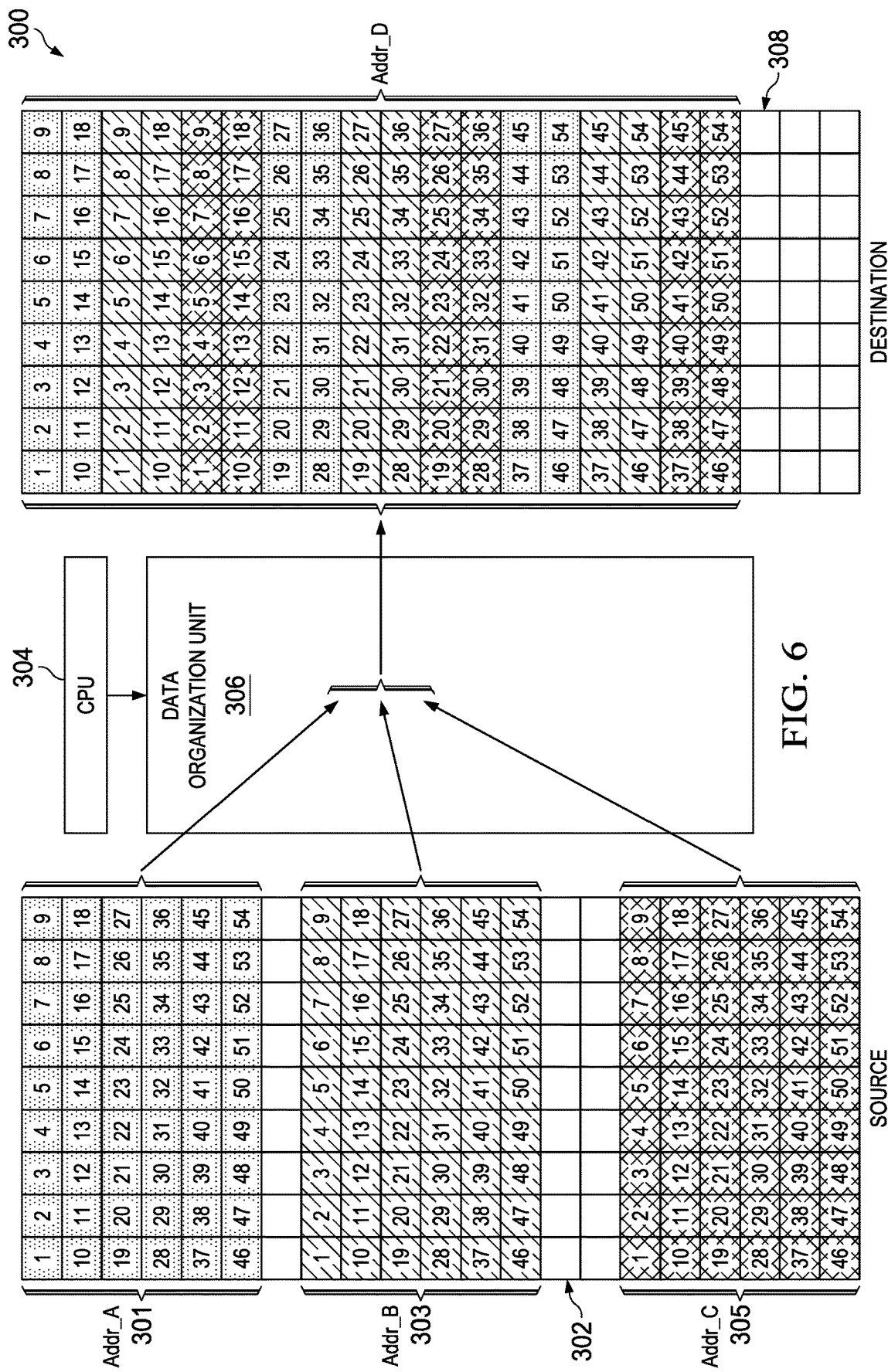
FIG. 6 illustrates an embodiment method of streaming-mode gathering performed by a DOU.

FIG. 6 illustrates the method 300 for streaming gathering, performed by the DOU 306. The CPU 304 sends commands to the DOU 306. The data is stored in the source storage 302 in three different regions. The region 301 has an address of Addr_A, the region 303 has an address of Addr_B, and the region 305 has an address of Addr_C. The data is read from the source storage 302 into the DOU 306, where it is gathered. The data is gathered from non-contiguous locations in the source storage 302, to be stored contiguously in the destination storage 308. The gathered data is then written to Addr_D of the destination storage 308.

Figure 7:
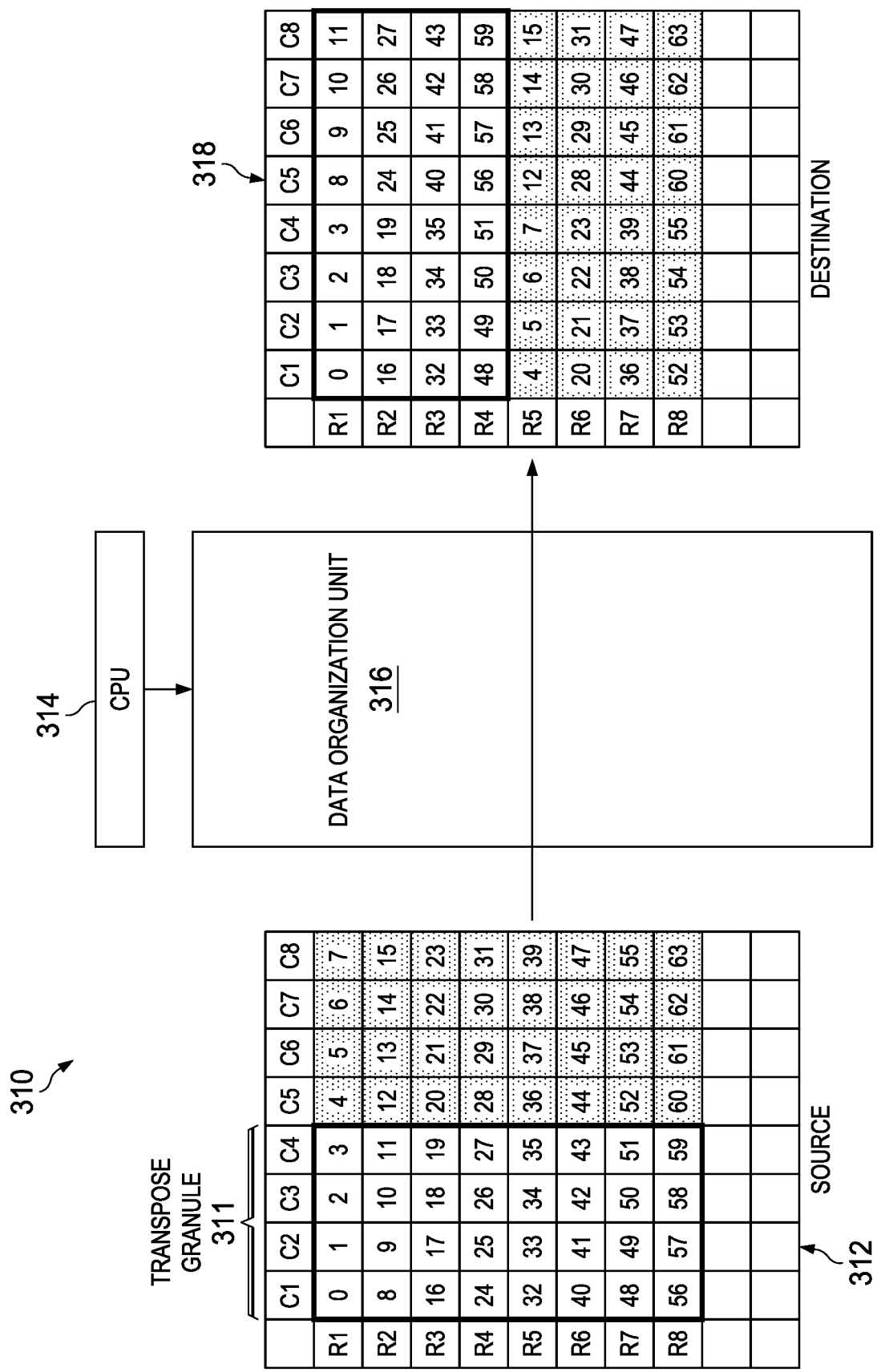
FIG. 7 illustrates an embodiment method of matrix transposition performed by a DOU.

FIG. 7 illustrates the method 310 for matrix transposition with a transpose granule of four elements. The CPU 314 sends commands to the DOU 316. Data is read in to the DOU 316 from the source storage 312. The source storage 312 is an 8×8 matrix stored in row-major form, with the transpose granule 311 with four elements. Row-major form and column-major form are two methods for arranging multidimensional arrays in linear storage. In row-major form, consecutive elements of the rows of the array are contiguous in memory. The DOU 316 transposes the data. The transposed data is written to the destination storage 318 in column-major form. In column major form, consecutive elements of the columns are contiguous.

Figure 8:
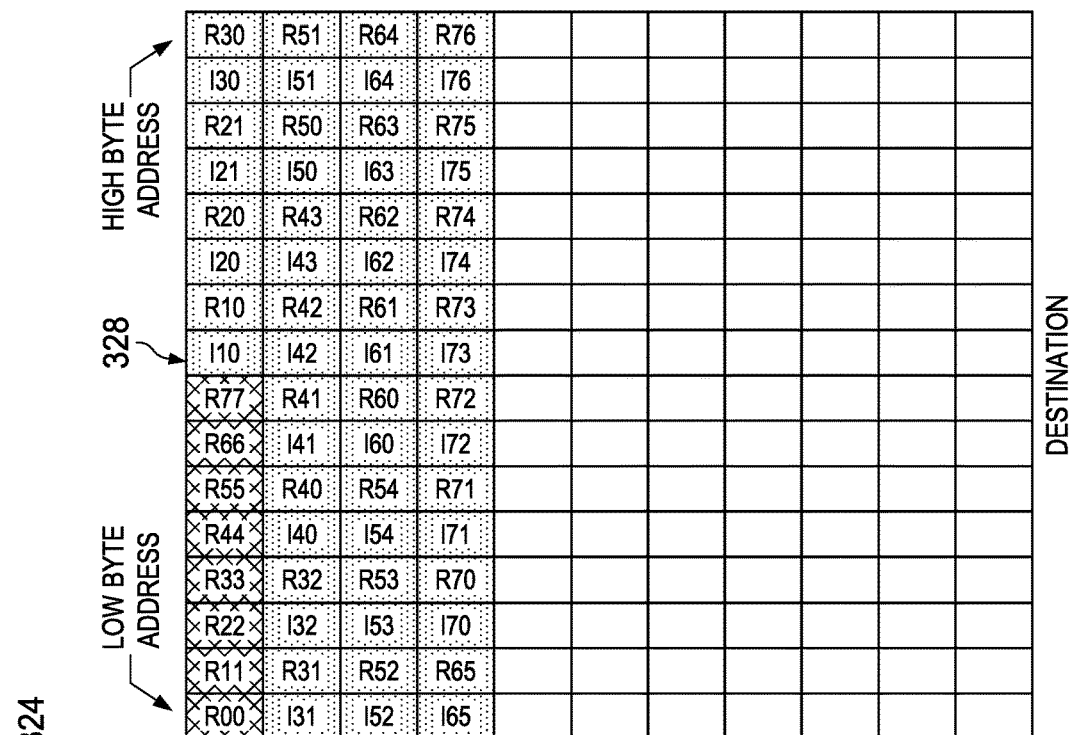
FIG. 8 illustrates an embodiment method of Hermitian matrix compression storage performed by a DOU.
Figure 8:
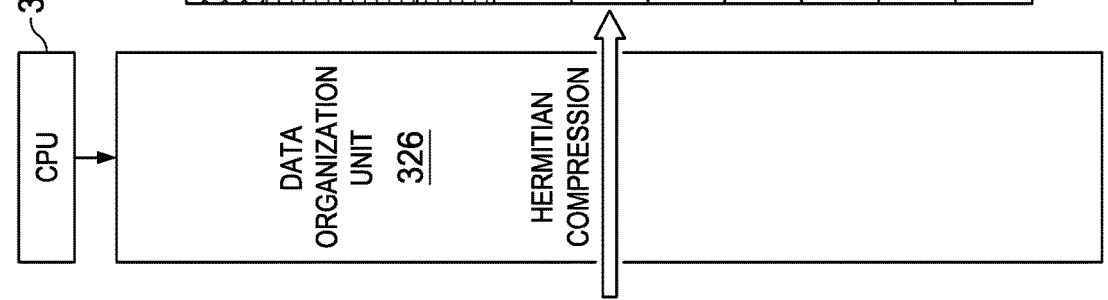
Figure 8:
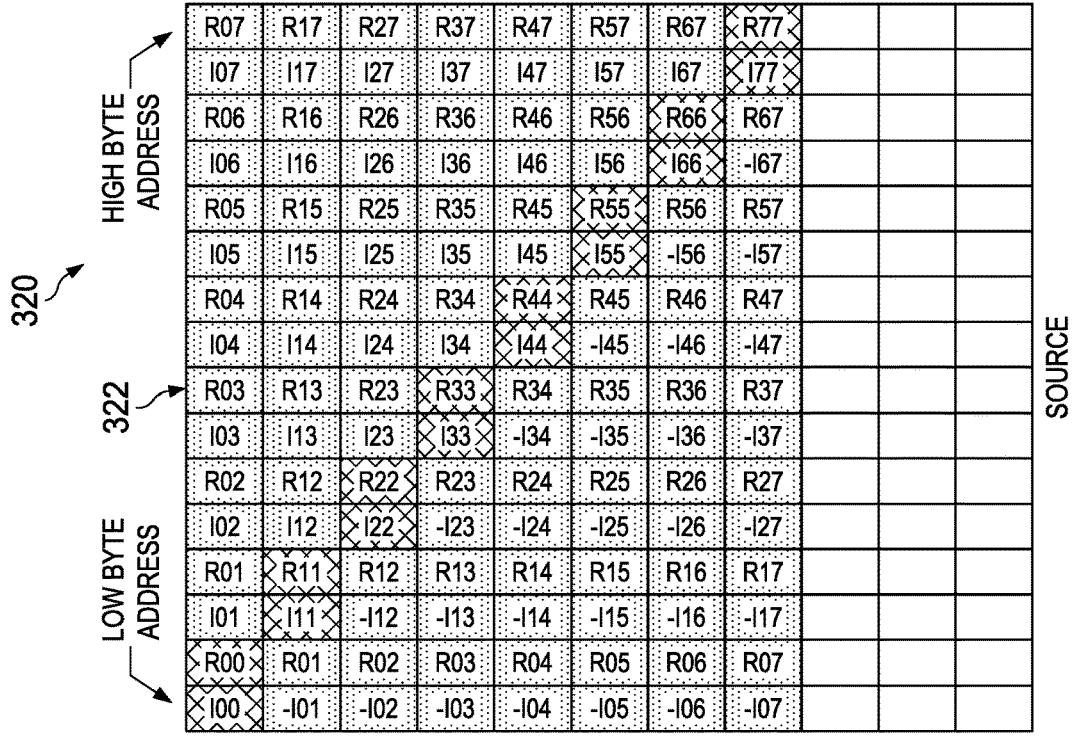

FIG. 8 illustrates the method 320 for an embodiment method of Hermitian matrix compression storage. A Hermitian matrix is a complex square matrix that is equal to its own conjugate transpose. The diagonal elements of a Hermitian matrix are real, because they have to be equal to their complex conjugate. A Hermitian matrix is stored in the source storage 322 as complex data in big-endian format in memory. The complex number is equal to the sum of the real part (Rxx) and the imaginary part (iIxx). The compressed Hermitian matrix includes the diagonal elements, followed by the lower triangular elements. The upper triangular elements have been removed, because they can be determined from the lower triangular elements. The Hermitian matrix is stored in as an 8×8 matrix row-major format in the source storage 322. The DOU 326 receives commands from the CPU 324. The DOU reads the Hermitian matrix from the source storage 322, and performs Hermitian compression. The compressed Hermitian matrix is then stored by the DOU 326 in the destination storage 328 as complex data in big-endian format in memory. The diagonal elements of the Hermitian matrix are purely real. The destination storage 328 uses half the storage of the source storage 322.

Figure 9:
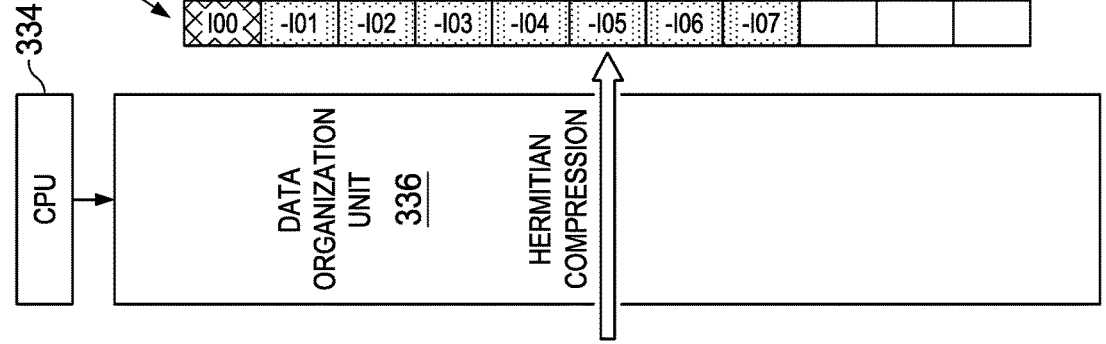
FIG. 9 illustrates an embodiment method of Hermitian matrix expansion performed by a DOU.

FIG. 9 illustrates the method 330 for an embodiment method of Hermitian matrix expansion. The DOU 336 receives commands from the CPU 334. The source storage 332 includes a compressed Hermitian matrix in big-endian format in memory. The compressed Hermitian matrix includes the diagonal elements, followed by the lower triangular elements. The DOU 336 reads in the compressed Hermitian matrix from the source storage 332, and expands the Hermitian elements. The upper diagonal elements are determined to be the complex conjugate of the corresponding lower triangular elements. The expanded Hermitian matrix is stored in the destination storage 338 by the DOU 336 in big-endian format. The destination storage 338 contains an 8×8 Hermitian matrix stored in row major form. In another embodiment, the Hermitian matrix is stored in column-major form.

Figure 10:
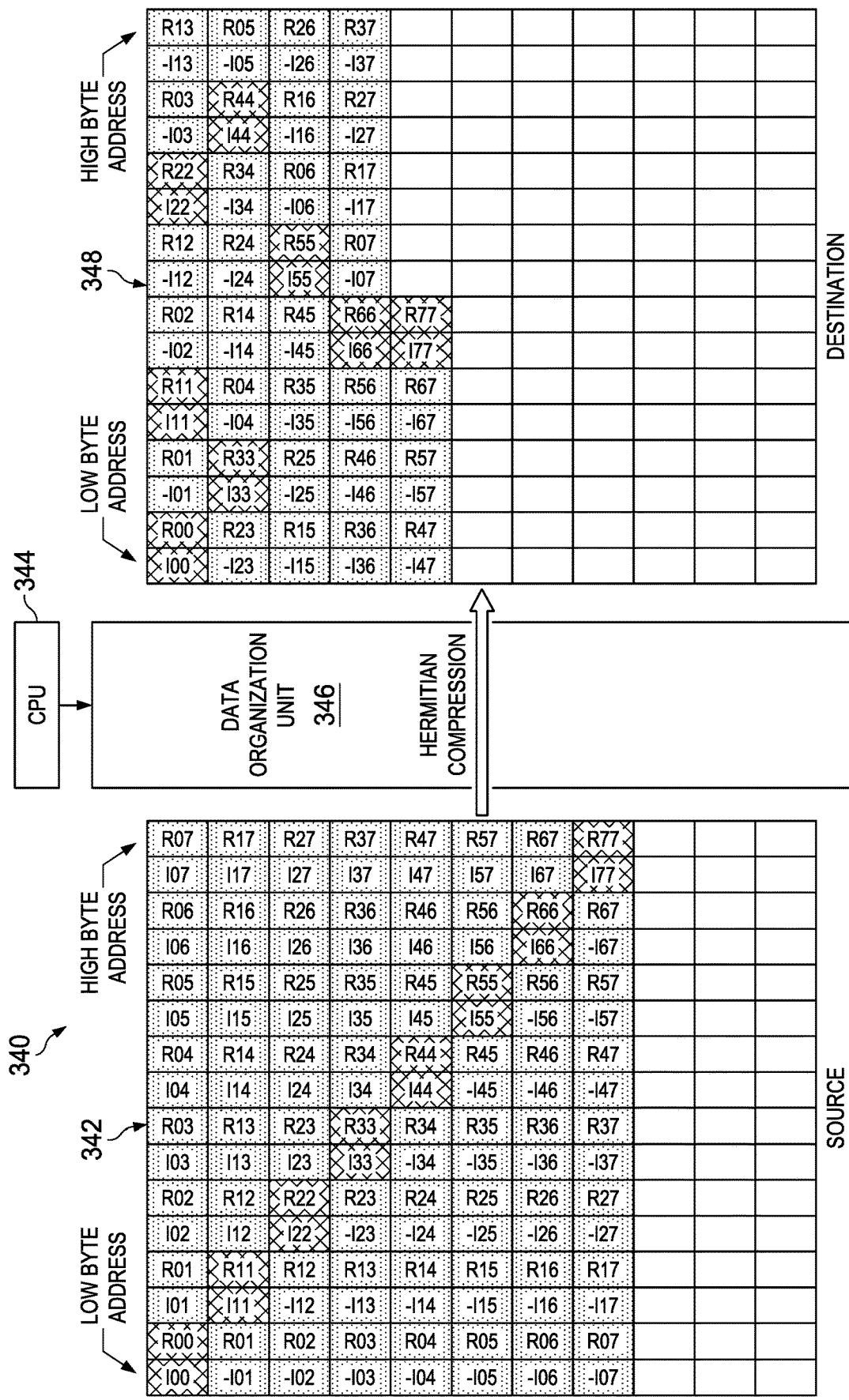
FIG. 10 illustrates another embodiment method of Hermitian matrix compression storage performed by a DOU.

FIG. 10 illustrates the method 340 for another embodiment method of Hermitian matrix compression. The DOU 346 receives commands from the CPU 344. A Hermitian matrix is stored in source storage 342 as an 8×8 matrix stored in row-major big-endian format. The DOU 346 reads in the Hermitian matrix from the source storage 342 and performs Hermitian compression. Redundant information is removed during the compression. The compressed Hermitian matrix is in lower triangular row-major big-endian format. The DOU 346 stores the compressed Hermitian matrix in the destination storage 348.

Figure 11:
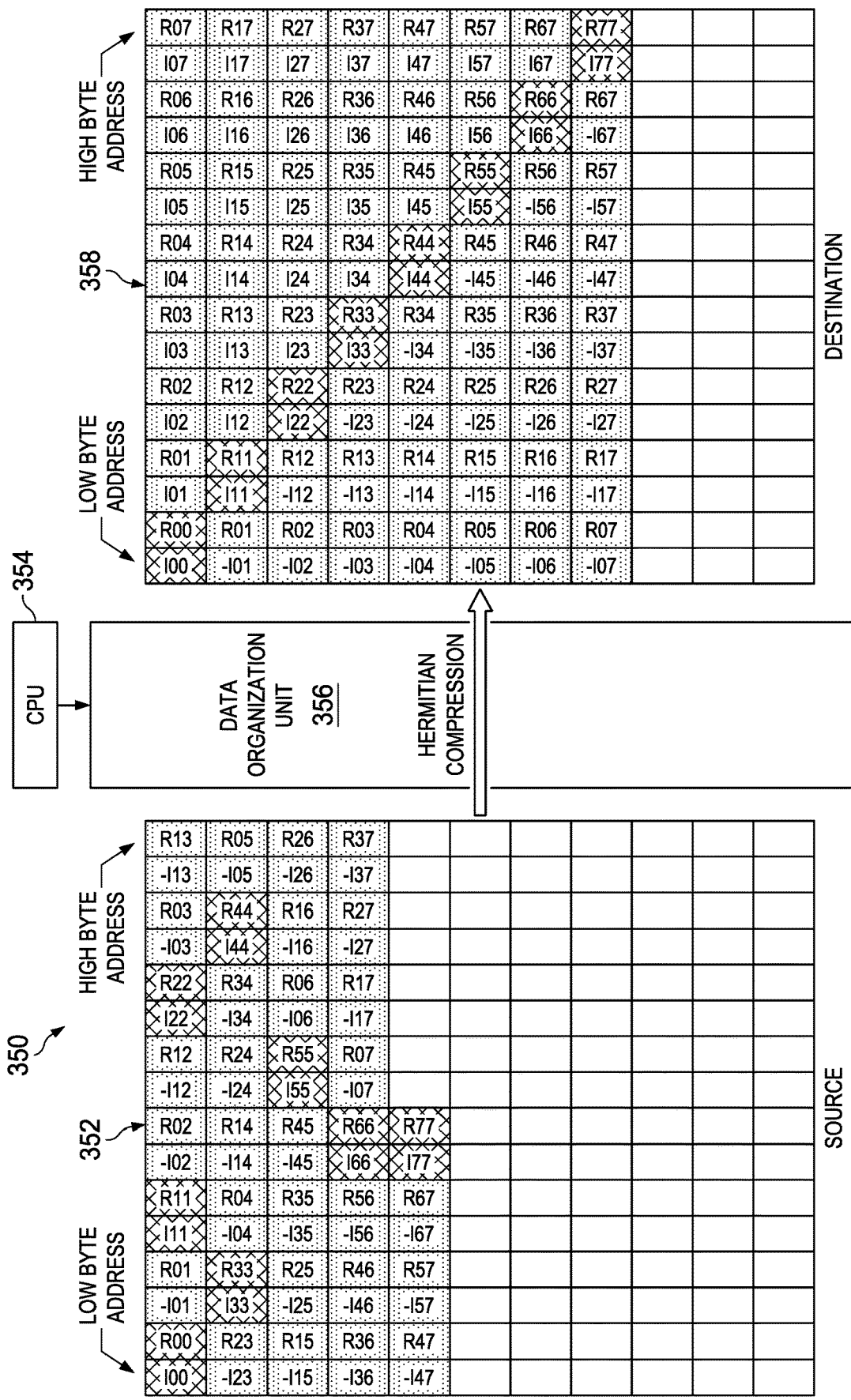
FIG. 11 illustrates another embodiment method of Hermitian matrix expansion performed by a DOU.

FIG. 11 illustrates the method 350 for Hermitian expansion of a Hermitian matrix in row-major form. The DOU 356 receives commands from the CPU 354. The DOU 356 reads in a compressed Hermitian matrix from the source storage 352. The compressed Hermitian matrix is stored in row-major lower triangular big-endian format. The DOU 356 performs Hermitian expansion on the compressed Hermitian matrix. The expanded Hermitian matrix is stored in the destination storage 358 in an 8×8 matrix in row-major big-endian format. In another example, the Hermitian matrix is stored in column-major form.

Figure 12:
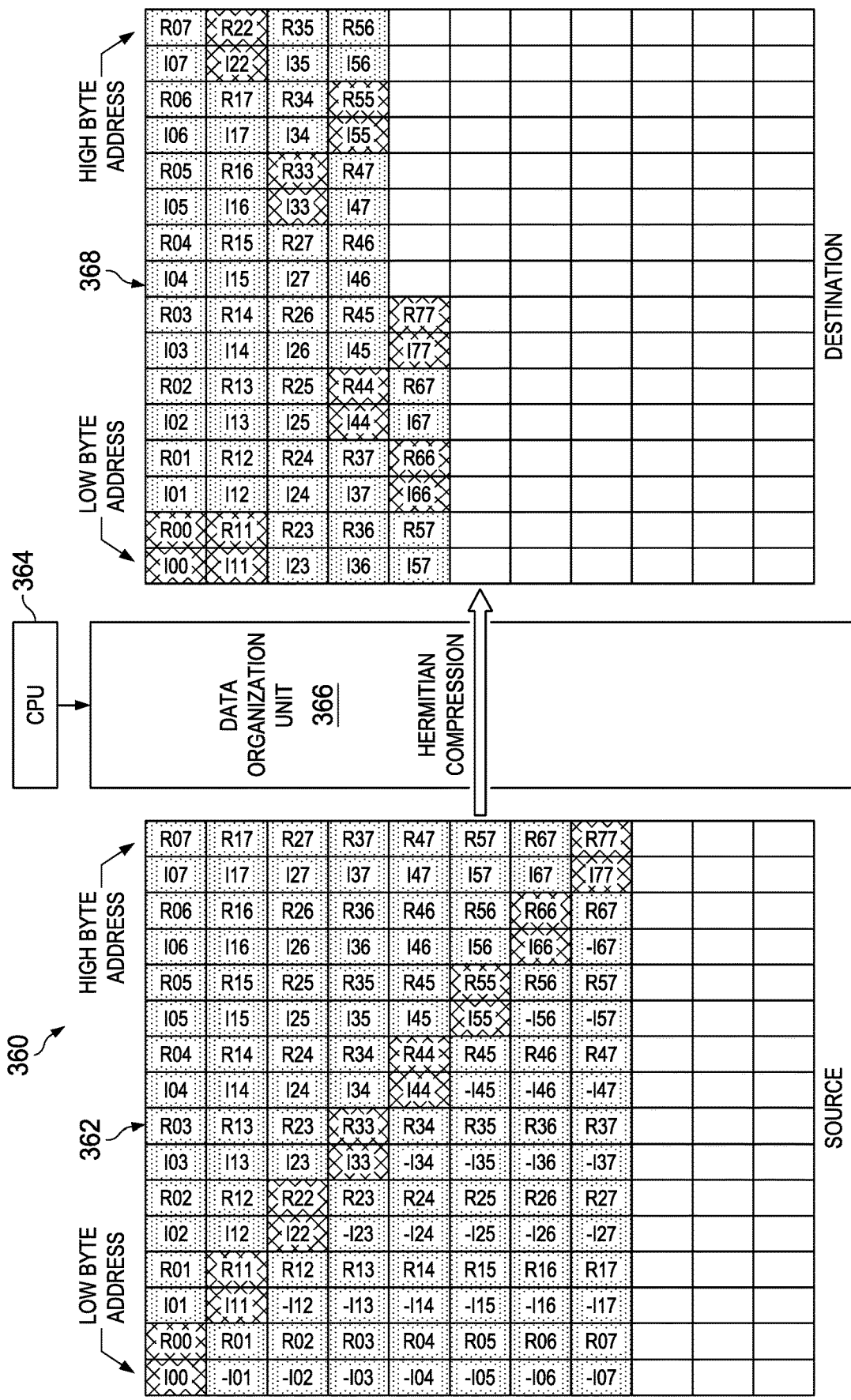
FIG. 12 illustrates an additional embodiment method of Hermitian matrix compression storage performed by a DOU.

FIG. 12 illustrates the method 360 for another embodiment method of Hermitian matrix compression. The DOU 366 receives commands from the CPU 364. The DOU 366 reads in a Hermitian matrix, which is stored as an 8×8 matrix in row-major big-endian format, from the source storage 362. The Hermitian matrix is compressed in column-major upper triangular big-endian format. Redundant elements from the lower triangular portion are removed. The DOU 366 stores the compressed Hermitian matrix in the destination storage 368.

Figure 13:
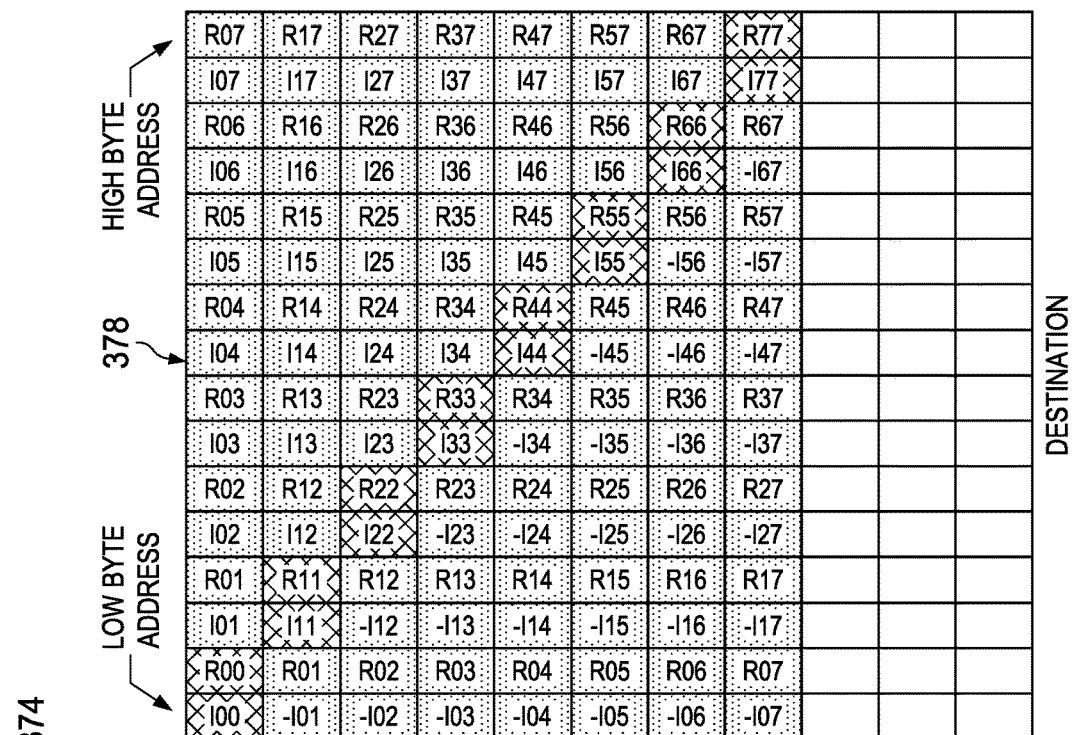
FIG. 13 illustrates an additional embodiment method of Hermitian matrix expansion performed by a DOU.
Figure 13:
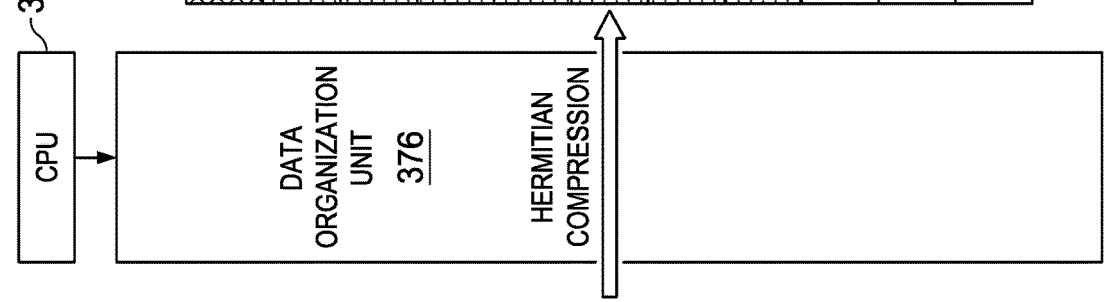
Figure 13:
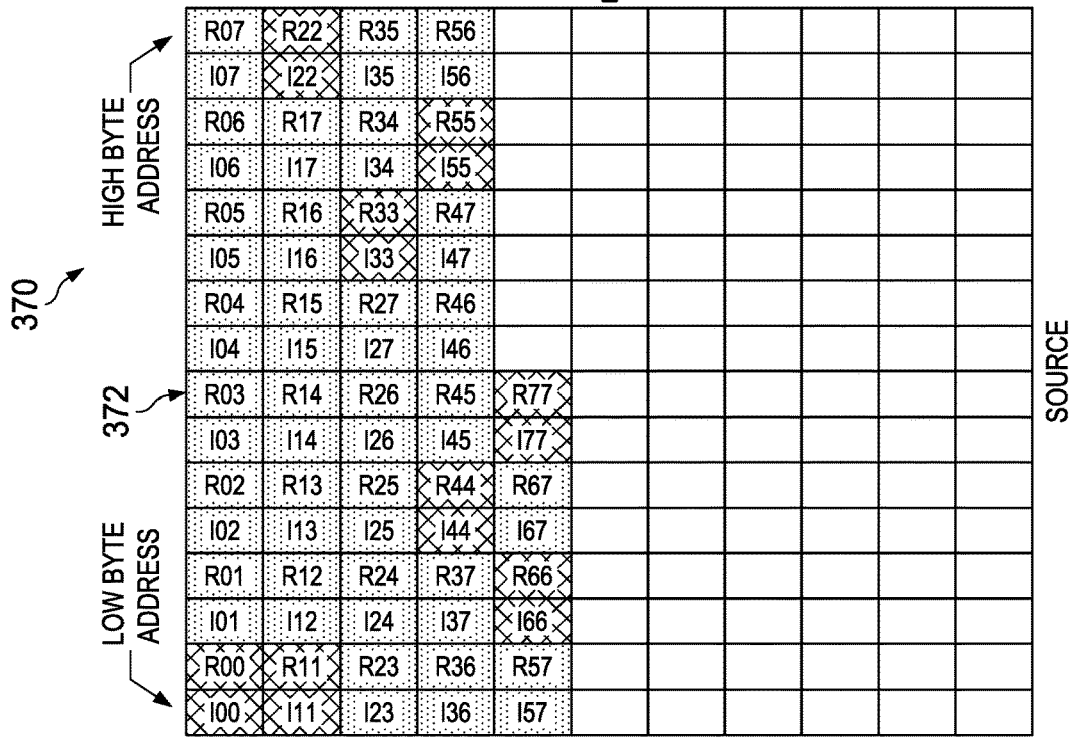

FIG. 13 illustrates the method 370 for Hermitian matrix expansion. The CPU 374 sends commands to the DOU 376. The source storage 372 includes a compressed Hermitian matrix in upper triangular column-major big-endian format. The DOU 376 reads in the compressed Hermitian matrix from the source storage 372 and performs Hermitian expansion. The lower triangular elements are determined based on the upper triangular elements. Then, the DOU 376 stores the expanded matrix in the destination storage 378 in an 8×8 matrix in row-major big-endian format. In another example, the Hermitian matrix is stored in column-major form.

Hermitian matrix compression and expansion is an example of compression and expansion. In other embodiments, different methods of compression and expansion are used.

Figure 14:
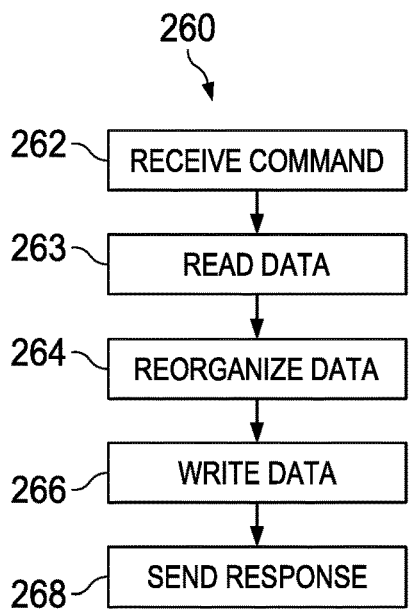
FIG. 14 illustrates a flowchart of an embodiment method of data reorganization performed by a DWE.

FIG. 14 illustrates flowchart 260 for an embodiment method of reorganizing data, performed by a DOU. Initially, in step 262, the DOU receives a command from a CPU. The command may be received over a queue interface. The queue interface may be a 256 bit interface, a 128 bit interface, a 64 bit interface, or a 32 bit interface. The message instructs the DOU to reorganize data.

In step 263, the DOU reads in data from external data storage. The data may be read in over an interface, for example an AXI interface.

Then, in step 264, the DOU reorganizes data read in step 263 based on the command received in step 262. Reads and writes are aggregated to the memory interface.

In step 266, the reorganized data is written to external data storage. This may be done over an interface, such as an AXI interface.

In step 268, the DOU sends a response to the CPU core. The response may be sent over a message queue, which may be 64 bits, 32 bits, or 16 bits. The response indicates whether the data reorganization has been successful.

Figure 15:
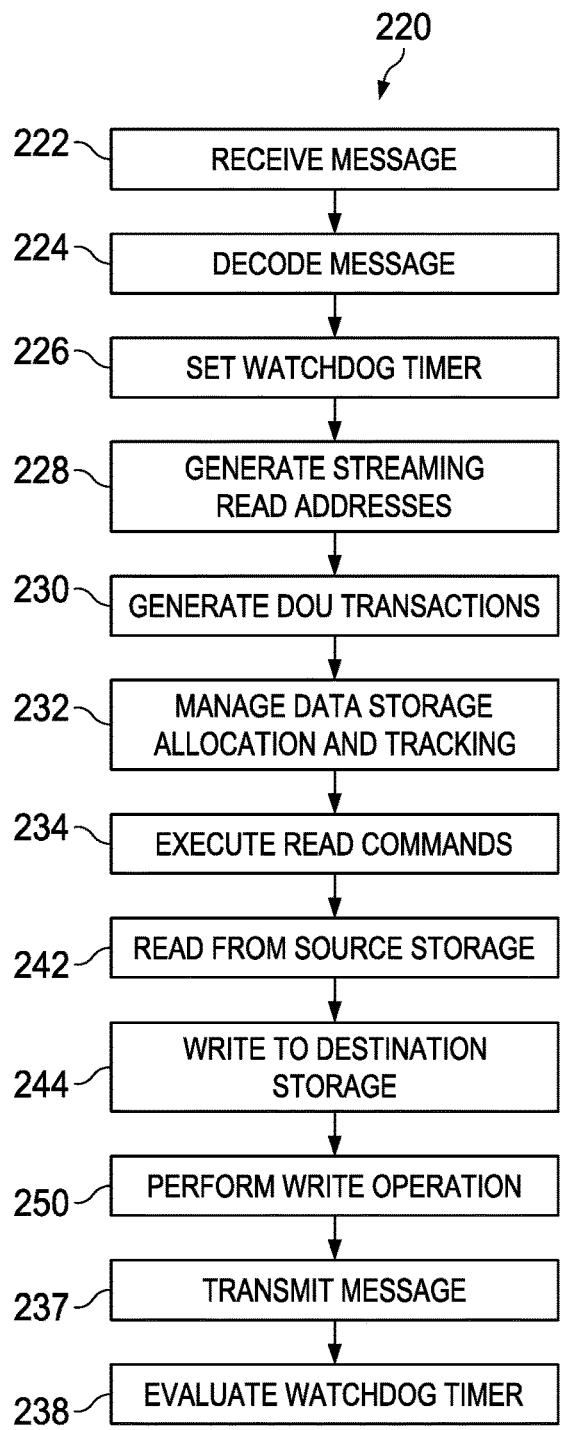
FIG. 15 illustrates a flowchart of an embodiment method of reorganizing data performed by a DOU.

FIG. 15 illustrates flowchart 220 for an embodiment method of performing operations in a DOU. Initially, in step 222, the DOU receives a command from a CPU core. The message is received in a command queue, for example a 128 bit queue. Other sized queues, for example a 256 bit queue, a 64 bit queue, or a 32 bit queue, may be used. The command instructs the DOU on an appropriate action to take.

Next, in step 224, the DOU decodes the message. The message receiver determines the address, the number of bytes, and the action to be performed. For example, the message receiver may receive the absolute address. In another example, the message receiver determines the absolute address based on the command, for example using a look-up table. The message receiver may configure the streaming read and write addresses. In an example, the message receiver configures a transaction generator, for example by transmitting address bytes to the transaction generator. The message receiver may also receive messages from the off chip data storage, for example indicating the success or failure of a read or write.

In step 226, the DOU sets a watchdog timer. The watchdog timer is used to prevent a deadlock.

In step 228, the DOU generates streaming read addresses. Streaming read addresses may be generated based on a pattern programmed by the CPU core. The streaming addresses are generated based on commands received in step 222, and are sent to the read command queue. Streaming addresses are generated in streaming mode. In other modes, such as implicit address mode and implicit address mode, streaming addresses are not generated.

In step 230, the DOU generates DOU transactions. Transactions are generated for non-uniform mode or streaming mode. Requests for allocated cache lines in source storage are sent. Also, requests are submitted to a read command queue in a pipelined manner. When a transaction is hit in the source storage, the request is cancelled.

In step 232, data storage allocation and tracking is managed by the DOU. The storage lines for the DOU transaction in the source storage are allocated and tracked. When a storage line which is requested has already been allocated, a kill signal is sent to the read command queue to prevent redundant requests.

In step 234, the DOU executes read commands. The read commands are received in the read command queue. Commands are submitted or removed based on the data storage allocation and tracking. Data is read from external data storage over an interface, for example an AXI interface. Data returned from the read commands is placed in the appropriately allocated source line in the source cache storage.

In step 242, the DOU reads from source cache storage. The read data is converted to an interface specific protocol, and is output. Read data to be returned to storage is routed to the appropriate storage line in the destination storage. Reading from source storage and writing to destination storage may be coordinated using a non-uniform mode eviction FIFO.

In step 244, data is written to the destination storage. Narrow non-uniform writes are aggregated into burst writes. The source storage commands from the non-uniform mode eviction FIFO are read. When a flush command is received from the CPU core, the source storage is flushed.

In step 250, a write operation is performed. Write operations may be performed for aligned or non-aligned addresses on external data storage. The data may be written using an interface, for example an AXI interface. Also, write responses indicating that the write has been committed to storage, are tracked.

In step 237, the read and/or write messages are transmitted to the CPU core by the DOU. The messages indicate whether read operations and/or write operations have been successful. The response message may be sent over a response queue.

In step 238, the watchdog timer set in step 226 is evaluated. The watchdog timer kills operations if they have not been completed after a period of time. This prevents the system from getting hung up.

Figure 16:
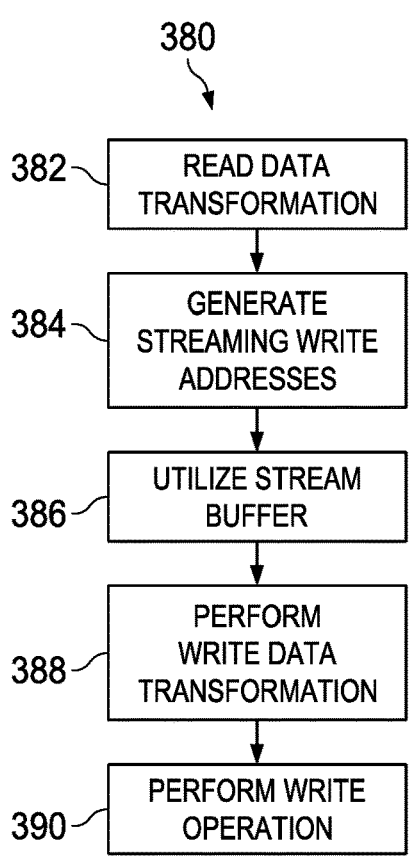
FIG. 16 illustrates a flowchart of an embodiment method of streaming performed by a DOU.

FIG. 16 illustrates the flowchart 380 for an embodiment method of streaming access, performed by a DOU. In step 382, a read data transformation is performed on incoming data, before it is stored in the stream buffer. Examples of transformations include compression, Hermitian compression, and format conversion. Examples of format conversion include conversion from fixed point to floating point, and conversion from floating point to fixed point. In an example, streaming gathering is performed.

In step 384, streaming write addresses are generated. Streaming write addresses are generated based on a pattern programmed by the core of the DWE via command messages. The streaming write address generator reads data from the stream buffer. Then, the streaming write address generator creates and sends appropriate memory write requests to the write command queue.

In step 386, the stream buffer, a circular buffer, is used. Circular buffering is performed to temporarily store streaming data. Corner turns, such as matrix transposition, may be performed. In one embodiment, the stream buffers are separate blocks. In another embodiment, the stream buffers are overlaid with the storage for source and/or destination cache.

In step 388, write data transformation is performed on outgoing data, before it is written to the write command queue. Examples of outgoing data transformations include expansion, Hermitian expansion, and format conversion, such as conversion from fixed point to floating point, or conversion from floating point to fixed point.

In step 390, a write operation is performed. The write manager is synchronized with the DOU write interface. Back pressure may be generated when the DOU write interface is stalled. The write commands are removed from the write queue, along with the write data. An interface specific protocol conversion may be performed on the data to be written. For example, the data may be converted to an AXI formation, for example a 256 bit AXI interface with byte enables. When write transactions are completed, the DOU write interface notifies the message encoder that the operation is complete.

An embodiment aggregates memory accesses to improve the memory controller pin utilization and bandwidth. The DWE may be useful in DDR memory to improve bandwidth and pin utilization. An embodiment reduces cache penalties and complexities by organizing the data in a cache friendly manner. Multiple antenna dominated baseband data access patterns involve data being gathered from multiple locations. A multi-way cache for different receive antennas on a nodeB is used to cover accessing data from multiple addresses. An embodiment enables programmable compute engines, such as DSPs, to perform signal processing functionalities more efficiently. An embodiment reduces the program code which may otherwise be used to manage address pointers and data organizations. An embodiment brings data from multiple configurable numbers of address pointers to cover a wide variety of data access patterns in wireless baseband algorithms. An embodiment reduces the use of multi-ported multi-banked memory based data organization for HACs. An embodiment uses efficient power management for programmable compute engines. The use of data reorganization may reduce the size of memory needed.

Table 1 illustrates a DWE simulation. The performance number for the data organization and aggregation and disaggregation is performed on a baseline core (Bmode) and with a DWE (Dmode). Bmode represents a SoC system implementation without DWE. Dmode represents a DOU based DWE embedded inside a SoC system implementation. The DOU outperforms the baseline access pattern by 60%, including the overhead associated with configuring the DOU and the metadata updates.

TABLE 1

| Runs | Total Data Size | Total Cycles BMode | Total Cycles DMode | Improvement | Cycles per Byte BMode | Cycles per Byte DMode | Overhead Cycles per Byte BMode | Overhead Cycles per Byte DMode |
|---|---|---|---|---|---|---|---|---|
| 6 | 10877 | 66165 | 26347 | 60.179% | 6.083 | 2.422 | 0.826 | 0.820 |

An embodiment method and logic is used to aggregate, organize, and optimize non-uniform data accesses and patterned streamline data accesses while moving data from one memory storage to another memory storage. An embodiment incorporates source storage and destination storage. An embodiment DOU arranges data in an algorithm specific format, such as a matrix stored contiguously in memory, transposing a distributed matrix (stored non-contiguously in memory), and compressing and expanding Hermitian matrices.

Figure 17:
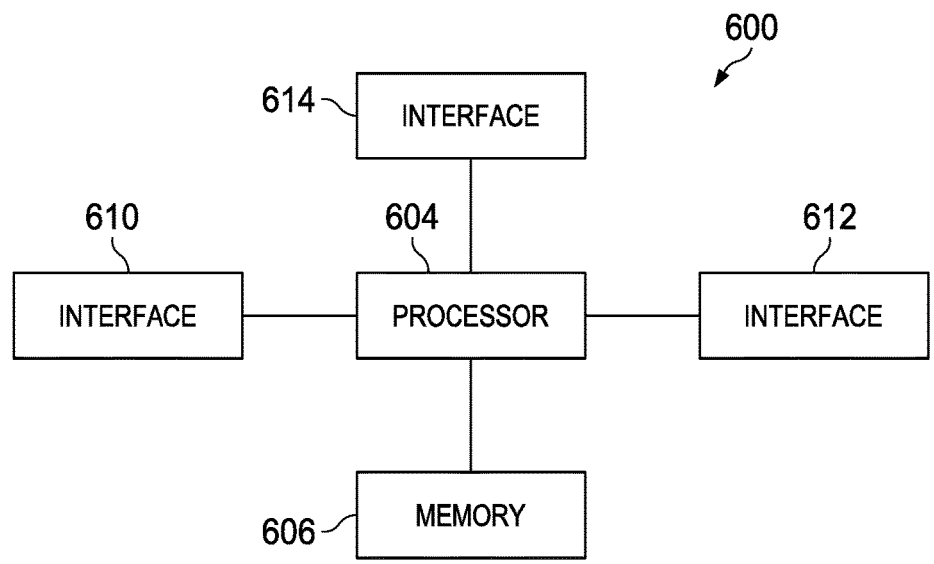
FIG. 17 illustrates a block diagram of an embodiment processing system.

FIG. 17 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 17. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 17, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 18:
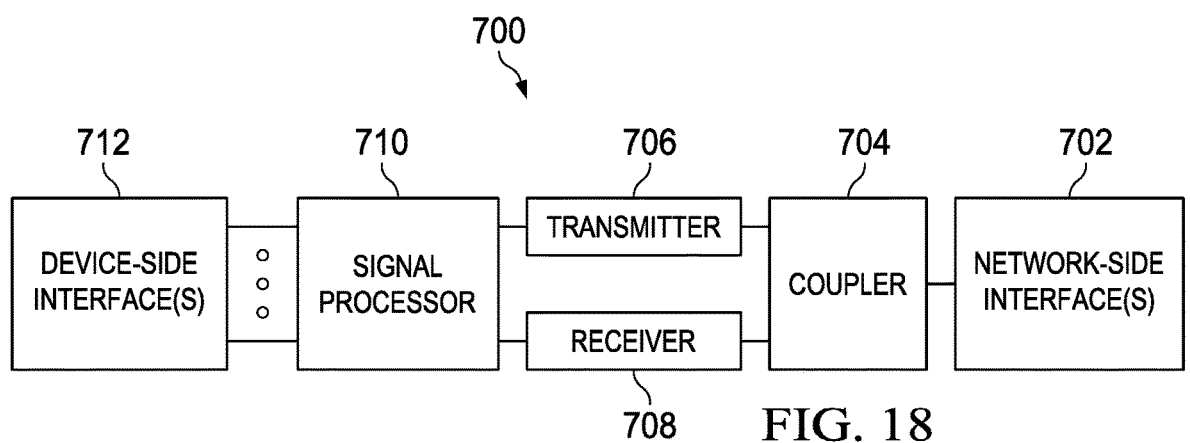
FIG. 18 illustrates a block diagram of an embodiment a transceiver.

In some embodiments, one or more of the interfaces 610, 612, 614 connects the processing system 600 to a transceiver adapted to transmit and receive signaling over the telecommunications network. FIG. 18 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A data warehouse engine (DWE) comprising:
a central processing unit (CPU) core;
a first data organization unit (DOU) comprising:
  a cache storage of a non-uniform access engine of the DOU for non-uniform access,
    a streaming buffer of a streaming access engine of the DOU for streaming access,
  a command queue (cQ) message decoder coupled to the cache storage, wherein the cQ message decoder is configured to receive a command from the CPU core, and
  a read interface coupled to the cache storage and the streaming buffer, wherein the read interface is configured to receive data from data storage and, in accordance with the command, store the data in the cache storage or forward the data for storage in the streaming buffer,
  wherein the first DOU is configured to aggregate read operations, and to determine whether to store the data in the cache storage or the streaming buffer in accordance with the command sent from the CPU core; and
a first command queue coupled between the CPU core and the first DOU, wherein the first command queue is configured to convey the command from the CPU core to the first DOU.

2. The DWE of claim 1, further comprising a response queue coupled between the first DOU and the CPU core, wherein the response queue is configured to convey responses from the first DOU to the CPU core.

3. The DWE of claim 1, wherein the first DOU is further configured to perform on-the-fly data reorganization.

4. The DWE of claim 1, further comprising:
a second DOU; and
a second command queue coupled between the CPU core and the second DOU.

5. The DWE of claim 1, wherein the first DOU is further configured to perform at least one of: disaggregate write operations, disaggregate read operations, and aggregate write operations.

6. A data organization unit (DOU) comprising:
a source cache storage of a non-uniform access engine of the DOU;
a streaming buffer of a streaming access engine of the DOU;
a command queue (cQ) message decoder coupled to the source cache storage, wherein the cQ message decoder is configured to receive a message from a central processing unit (CPU) core; and
a read interface coupled to the source cache storage and the streaming buffer, wherein the read interface is configured to receive data from data storage and, in accordance with the message, store the data in the source cache storage or forward the data for storage in the streaming buffer.

7. The DOU of claim 6, further comprising:
an elastic buffer coupled to the source cache storage; and
a destination cache storage coupled to the elastic buffer.

8. The DOU of claim 7, further comprising:
a write manager coupled to the destination cache storage;
a write command queue coupled to the write manager; and
a write interface coupled to the write command queue.

9. The DOU of claim 8, further comprising a response queue (rQ) message encoder coupled to the write interface, wherein the rQ message encoder is configured to send response messages to the CPU.

10. The DOU of claim 8, further comprising:
a read data transformer coupled to the read interface between the read interface and the streaming buffer; and
a streaming write address generator coupled to the cQ message decoder and the stream buffer.

11. The DOU of claim 10, further comprising a write transformer coupled between the streaming buffer and the write command queue.

12. The DOU of claim 6, further comprising a transaction generator coupled to the cQ message decoder.

13. The DOU of claim 12, further comprising a data storage allocator and tracker coupled between the transaction generator and the source cache storage.

14. The DOU of claim 12, further comprising:
a streaming read address generator coupled to the cQ message decoder and to the transaction generator; and
a read command queue coupled to the streaming read address generator and to the read interface.

15. A method comprising:
receiving, by a data organization unit (DOU) from a central processing unit, a message;

obtaining, by the DOU from a source storage, first data, in accordance with the message;

determining whether to store the first data in a source cache storage or a streaming buffer in accordance with the message;

storing the first data in the source cache storage or the streaming buffer in accordance with the determination;

reorganizing the first data to produce second data; and storing the second data in a destination storage.

16. The method of claim 15, wherein the source storage is the destination storage.

17. The method of claim 15, wherein reorganizing the first data comprises scattering the first data using disaggregation.

18. The method of claim 17, wherein scattering the first data comprises performing non-uniform scattering or streaming scattering.

19. The method of claim 15, wherein reorganizing the first data comprises gathering the first data using aggregation.

20. The method of claim 19, wherein gathering the first data comprises performing non-uniform gathering or streaming scattering.

* * * * *